(12) United States Patent
Kim et al.

(10) Patent No.: US 11,063,716 B2
(45) Date of Patent: Jul. 13, 2021

(54) METHOD FOR TRANSMITTING AND RECEIVING REFERENCE SIGNAL IN WIRELESS COMMUNICATION SYSTEM AND APPARATUS FOR THE SAME

(71) Applicant: LG ELECTRONICS INC., Seoul (KR)

(72) Inventors: Hyungtae Kim, Seoul (KR); Jiwon Kang, Seoul (KR); Kijun Kim, Seoul (KR); Hyunsoo Ko, Seoul (KR); Kyuseok Kim, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 16/319,266

(22) PCT Filed: Aug. 8, 2018

(86) PCT No.: PCT/KR2018/009053
§ 371 (c)(1),
(2) Date: Feb. 20, 2020

(87) PCT Pub. No.: WO2019/031856
PCT Pub. Date: Feb. 14, 2019

(65) Prior Publication Data
US 2020/0213049 A1 Jul. 2, 2020

Related U.S. Application Data

(60) Provisional application No. 62/544,009, filed on Aug. 11, 2017, provisional application No. 62/542,782, filed on Aug. 8, 2017.

(51) Int. Cl.
*H04L 5/00* (2006.01)
*H04W 72/04* (2009.01)

(52) U.S. Cl.
CPC ......... *H04L 5/0048* (2013.01); *H04W 72/042* (2013.01)

(58) Field of Classification Search
CPC ... H04L 5/0048; H04L 5/0051; H04L 5/0053; H04L 5/0023; H04L 27/2613
See application file for complete search history.

(56) References Cited

U.S. PATENT DOCUMENTS

2017/0366377 A1* 12/2017 Papasakellariou .... H04L 27/261
2018/0278395 A1* 9/2018 Yoon ..................... H04L 5/0051
(Continued)

FOREIGN PATENT DOCUMENTS

EP 3506545 7/2018
JP 2015073327 4/2015
(Continued)

OTHER PUBLICATIONS

Huawei, "Remaining issues for DMRS", R1-101951, 3GPP TSG RAN WG1 meeting #60bis, Beijing, China, Apr. 12-16, 2010, 10 pages.
(Continued)

*Primary Examiner* — Jung H Park
(74) *Attorney, Agent, or Firm* — Fish & Richardson P.C.

(57) ABSTRACT

A method for transmitting and receiving a Reference Signal in a wireless communication system performed by a UE is disclosed. According to the present invention, a UE receives, from a base station, Downlink Control Information and receives a Demodulation Reference Signal (DMRS) through a plurality of antenna ports based on the Downlink Control Information and downlink data.
The UE demodulates the downlink data based on the DMRS, and the downlink data is received in a same symbol as the DMRS or in different symbols with each other based on a number of symbols related to the downlink data.

14 Claims, 20 Drawing Sheets

(56) References Cited

U.S. PATENT DOCUMENTS

| | | | |
|---|---|---|---|
| 2019/0037554 A1* | 1/2019 | Gao | H04L 5/0094 |
| 2020/0195317 A1* | 6/2020 | Yasukawa | H04W 72/0406 |

FOREIGN PATENT DOCUMENTS

| | | |
|---|---|---|
| JP | 2015518318 | 5/2015 |
| KR | 20140053847 | 5/2014 |
| KR | 20140109891 | 9/2014 |
| WO | WO2013/140732 | 9/2013 |
| WO | WO2019053863 | 3/2019 |

OTHER PUBLICATIONS

Huawei, HiSilicon, "Design of DL DMRS for data transmission," R1-1704233, 3GPP TSG RAN WG1 Meeting #88bis, Spokane, USA, Apr. 3-7, 2017, 8 pages.

Nokia, Alcatel-Lucent Shanghai Bell, "DL DM-RS patterns link performance evaluation," R1-1711306, 3GPP TSG RAN WG1 NR Ad-Hoc#2; Qingdao, P.R. China, Jun. 27-30, 2017, 9 pages.

Samsung, "DL RS Designs for Higher Order MIMO," R1-090619, 3GPP TSG RAN WG1 #56, Athens, Greece, Feb. 9-13, 2009, 9 pages.

ETRI, "Discussion on DMRS design," R1-1718002, 3GPP TSG RAN WG1 Meeting 90bis. Prague. CZ, Oct. 9-13, 2017, 6 pages.

Extended European Search Report in European Appln. No. 18830128.7, dated Jul. 6, 2020, 14 pages.

Nokia, Nokia Shanghai Bell, "On remaining issues of DL DM-RS for NR physical data channels," R1-1714255, 3GPP TSG RAN WG1 #90, Prague, Czech Republic, Aug. 21-25, 2017, 6 pages.

NTT Docomo, Inc., "sPUCCH for shortened TTI," R1-162695, 3GPP TSG RAN WG1 Meeting #87, Reno, USA Nov. 14-18, 2016, 9 pages.

* cited by examiner (a)

(b)

(a)

(b)

METHOD FOR TRANSMITTING AND RECEIVING REFERENCE SIGNAL IN WIRELESS COMMUNICATION SYSTEM AND APPARATUS FOR THE SAME

CROSS-REFERENCE TO RELATED APPLICATIONS

This application is the National Stage filing under 35 U.S.C. 371 of International Application No. PCT/KR2018/009053, filed on Aug. 8, 2018, which claims the benefit of U.S. Provisional Application No. 62/542,782, filed on Aug. 8, 2017, No. 62/544,009, filed on Aug. 11, 2017, the contents of which are all hereby incorporated by reference herein in their entirety.

TECHNICAL FIELD

The present invention relates to wireless communications, and more particularly, to a method and apparatus for determining a transmission power for a transmission of a demodulation reference signal in a wireless communication system.

BACKGROUND ART

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

DISCLOSURE

Technical Problem

An object of the present invention is to propose a method and apparatus for transmitting and receiving a Demodulation Reference Signal (DMRS) in a wireless communication system.

In addition, an object of the present invention is to propose a method and apparatus for mapping a Demodulation Reference Signal (DMRS) to a Resource Element (RE) in a wireless communication system.

In addition, an object of the present invention is to propose a method and apparatus for determining a transmission power for transmitting a Demodulation Reference Signal (DMRS) which is mapped to a Resource Element (RE) in a wireless communication system.

In addition, an object of the present invention is to propose a method and apparatus for multiplexing antenna ports for transmitting a Demodulation Reference Signal (DMRS).

In addition, an object of the present invention is to propose a method and apparatus for transmitting a Demodulation Reference Signal (DMRS) together with downlink data and other reference signal.

In addition, an object of the present invention is to propose a method and apparatus for considering whether to transmit a mapping pattern of a Demodulation Reference Signal (DMRS), other reference signal and downlink data, when determining a transmission power for transmitting a Demodulation Reference Signal (DMRS).

Technical objects to be achieved by the present invention are not limited to the aforementioned technical objects, and other technical objects not described above may be evidently understood by a person having ordinary skill in the art to which the present invention pertains from the following description.

Technical Solution

In order to solve the problem described above, according to an embodiment of the present invention, a method for transmitting and receiving a Reference Signal in a wireless communication system includes receiving, from a base station, Downlink Control Information; receiving a Demodulation Reference Signal (DMRS) and downlink data through a plurality of antenna ports based on the Downlink Control Information; and demodulating the downlink data based on the DMRS, and the downlink data is received in a same symbol as the DMRS or in different symbols with each other based on a number of symbols related to the downlink data.

In addition, in the present invention, a transmission power of the DMRS is determined based on whether the DMRS is received in the same symbol as the downlink data.

In addition, in the present invention, the transmission power of the DMRS is '0' dB power boosted when the DMRS is received in the same symbol as the downlink data, or '3' dB power boosted, otherwise.

In addition, in the present invention, the downlink control information includes comb information of the DMRS in which the downlink data is not received, and a transmission of Channel State Information reference signal is limited such that the DMRS and the Channel State Information reference signal are not received in the same symbol in the comb of the DMRS in which the downlink data is not received.

In addition, in the present invention, the downlink data is received in all resource elements in which the DMRS is not received among the resource elements included in the symbol in which the DMRS is received.

In addition, in the present invention, wherein different rate matching is applied to each of the plurality of symbols when the DMRS is received in a plurality of symbols.

In addition, in the present invention, each of the DMRSs is received through different transmission power according to the plurality of symbols in which the DMRS is received.

In addition, according to another aspect of the present invention, a UE includes a Radio Frequency (RF) unit for transmitting and receiving a radio signal; and a processor for controlling the RF unit, wherein the processor is configured to: receive, from a base station, Downlink Control Information; receive a Demodulation Reference Signal (DMRS) and downlink data through a plurality of antenna ports based on the Downlink Control Information; and demodulate the downlink data based on the DMRS, and the downlink data is received in a same symbol as the DMRS or in different symbols with each other based on a number of symbols related to the downlink data.

Technical Effects

According to an embodiment of the present invention, there is an effect that a downlink data and a DMRS may be transmitted together according to a symbol of a slot related to a data transmission.

In addition, according to an embodiment of the present invention, when a size of resource for transmitting a downlink data is great, the downlink data and a DMRS are not transmitted together, and there is an effect of boosting a transmission power of the DMRS.

In addition, according to an embodiment of the present invention, power boosting size of a DMRS is adjusted according to the number of groups of antenna ports to which the DMRS not transmitted with data is mapped, and a transmission power of the DMRS may be efficiently determined.

In addition, according to an embodiment of the present invention, other reference signal or data is not mapped to the symbol to which a DMRS is mapped according to a mapping pattern in which the DMRS is mapped to an RE, and accordingly, there is an effect that a power boosting of the DMRS may be efficiently performed.

In addition, according to an embodiment of the present invention, there is an effect that a method for multiplexing antenna ports in which a DMRS is transmitted may be determined according to a mapping pattern of the DMRS.

Effects which may be obtained by the present invention are not limited to the aforementioned effects, and other technical effects not described above may be evidently understood by a person having ordinary skill in the art to which the present invention pertains from the following description.

DESCRIPTION OF DRAWINGS

In order to help understanding of the present invention, the accompanying drawings which are included as a part of the Detailed Description provide embodiments of the present invention and describe the technical features of the present invention together with the Detailed Description.

MODE FOR INVENTION

Figure 1:
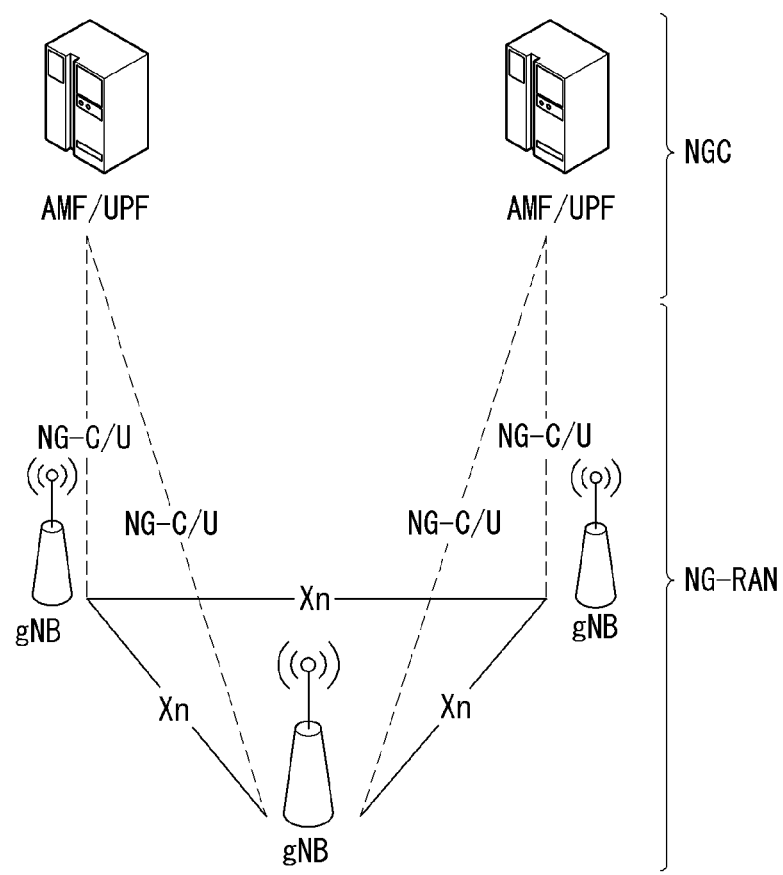
FIG. 1 is a diagram illustrating an example of an overall system structure of NR to which a method proposed in the present specification may be applied.

Some embodiments of the present disclosure are described in detail with reference to the accompanying drawings. A detailed description to be disclosed along with the accompanying drawings is intended to describe some exemplary embodiments of the present disclosure and is not intended to describe a sole embodiment of the present disclosure. The following detailed description includes more details in order to provide full understanding of the present disclosure. However, those skilled in the art will understand that the present disclosure may be implemented without such more details.

In some cases, in order to avoid making the concept of the present disclosure vague, known structures and devices are omitted or may be shown in a block diagram form based on the core functions of each structure and device.

In the present disclosure, a base station has the meaning of a terminal node of a network over which the base station directly communicates with a terminal. In this document, a specific operation that is described to be performed by a base station may be performed by an upper node of the base station according to circumstances. That is, it is evident that in a network including a plurality of network nodes including a base station, various operations performed for communication with a terminal may be performed by the base station or other network nodes other than the base station. The base station (BS) may be substituted with another term, such as a fixed station, a Node B, an eNB (evolved-NodeB), a base transceiver system (BTS), or an access point (AP). Furthermore, the terminal may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the present disclosure, and the use of such specific terms may be changed in various forms without departing from the technical sprit of the present disclosure.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

In addition, 5G NR (new radio) defines eMBB (enhanced Mobile Broadband), mMTC (massive Machine Type Communications), URLLC (Ultra-Reliable and Low Latency Communications) and V2X (vehicle-to-everything), according to a usage scenario.

And, 5G NR standard is distinguished into standalone (SA) and non-standalone (NSA) according to co-existence between NR system and LTE system.

Further, 5G NR supports various types of subcarrier spacing, and supports CP-OFDM in downlink, and supports CP-OFDM and DFT-s-OFDM (SC-OFDM) in uplink.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A, NR (New RAT) is chiefly described, but the technical characteristics of the present invention are not limited thereto.

Definition of Terms eLTE eNB: An eLTE eNB is an evolution of an eNB that supports a connection for an EPC and an NGC.

gNB: A node for supporting NR in addition to a connection with an NGC

New RAN: A radio access network that supports NR or E-UTRA or interacts with an NGC Network slice: A network slice is a network defined by an operator so as to provide a solution optimized for a specific market scenario that requires a specific requirement together with an inter-terminal range.

Network function: A network function is a logical node in a network infra that has a well-defined external interface and a well-defined functional operation.

NG-C: A control plane interface used for NG2 reference point between new RAN and an NGC NG-U: A user plane interface used for NG3 reference point between new RAN and an NGC Non-standalone NR: A deployment configuration in which a gNB requires an LTE eNB as an anchor for a control plane connection to an EPC or requires an eLTE eNB as an anchor for a control plane connection to an NGC Non-standalone E-UTRA: A deployment configuration an eLTE eNB requires a gNB as an anchor for a control plane connection to an NGC.

User plane gateway: A terminal point of NG-U interface

General System

FIG. 1 is a diagram illustrating an example of an overall structure of a new radio (NR) system to which a method proposed by the present disclosure may be implemented.

Referring to FIG. 1, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to a Access and Mobility Management Function (AMF) via an N2 interface and a User Plane Function (UPF) via an N3 interface.

NR (New Rat) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an Orthogonal Frequency Division Multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Regarding a frame structure in the NR system, a size of various fields in the time domain is expressed as a multiple of a time unit of $T_s=1$. $(\Delta f_{max} \cdot N_f)$. In this case, $\Delta f_{max}=480 \cdot 10^3$, and $N_f=4096$. DL and UL transmission is configured as a radio frame having a section of $T_f=(\Delta f_{max} N_f/100) \cdot T_s=10$ ms. The radio frame is composed of ten subframes each having a section of $T_{sf}=(\Delta f_{max} N_f/1000) \cdot T_s=1$ ms In this case, there may be a set of UL frames and a set of DL frames.

Figure 2:
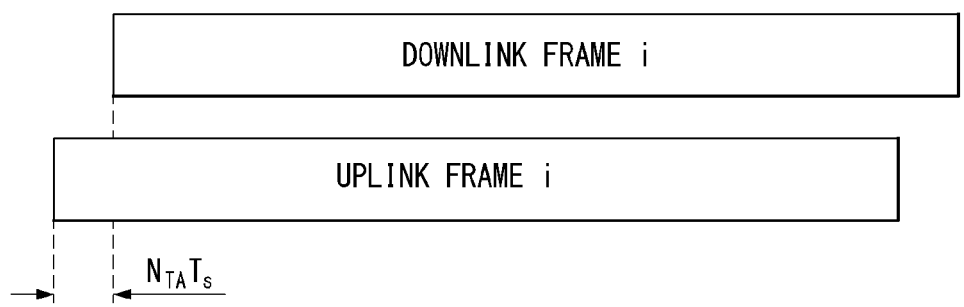
FIG. 2 illustrates a relationship between an uplink frame and a downlink frame in a wireless communication system to which the method proposed in the present specification may be applied.

FIG. 2 illustrates a relationship between a UL frame and a DL frame in a wireless communication system to which a method proposed by the present disclosure may be implemented.

As illustrated in FIG. 2, a UL frame number I from a User Equipment (UE) needs to be transmitted $T_{TA}=N_{TA}T_s$ before the start of a corresponding DL frame in the UE.

Regarding the numerology μ, slots are numbered in ascending order of $n_s^\mu \in \{0, \ldots, N_{subframe}^{slots,\mu}-1\}$ in a subframe, and in ascending order of $n_{s,f}^\mu \in \{0, \ldots, N_{frame}^{slots,\mu}-1\}$ in a radio frame. One slot is composed of continuous OFDM symbols of $N_{symb}^\mu$, and $N_{symb}^\mu$ is determined depending on a numerology in use and slot configuration. The start of slots $n_s^\mu$ in a subframe is temporally aligned with the start of OFDM symbols $n_s^\mu N_{symb}^\mu$ in the same subframe.

Not all UEs are able to transmit and receive at the same time, and this means that not all OFDM symbols in a DL slot or an UL slot are available to be used.

Table 2 shows the number of OFDM symbols per slot for a normal CP in the numerology μ, and Table 3 shows the number of OFDM symbols per slot for an extended CP in the numerology μ.

another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

Figure 3:
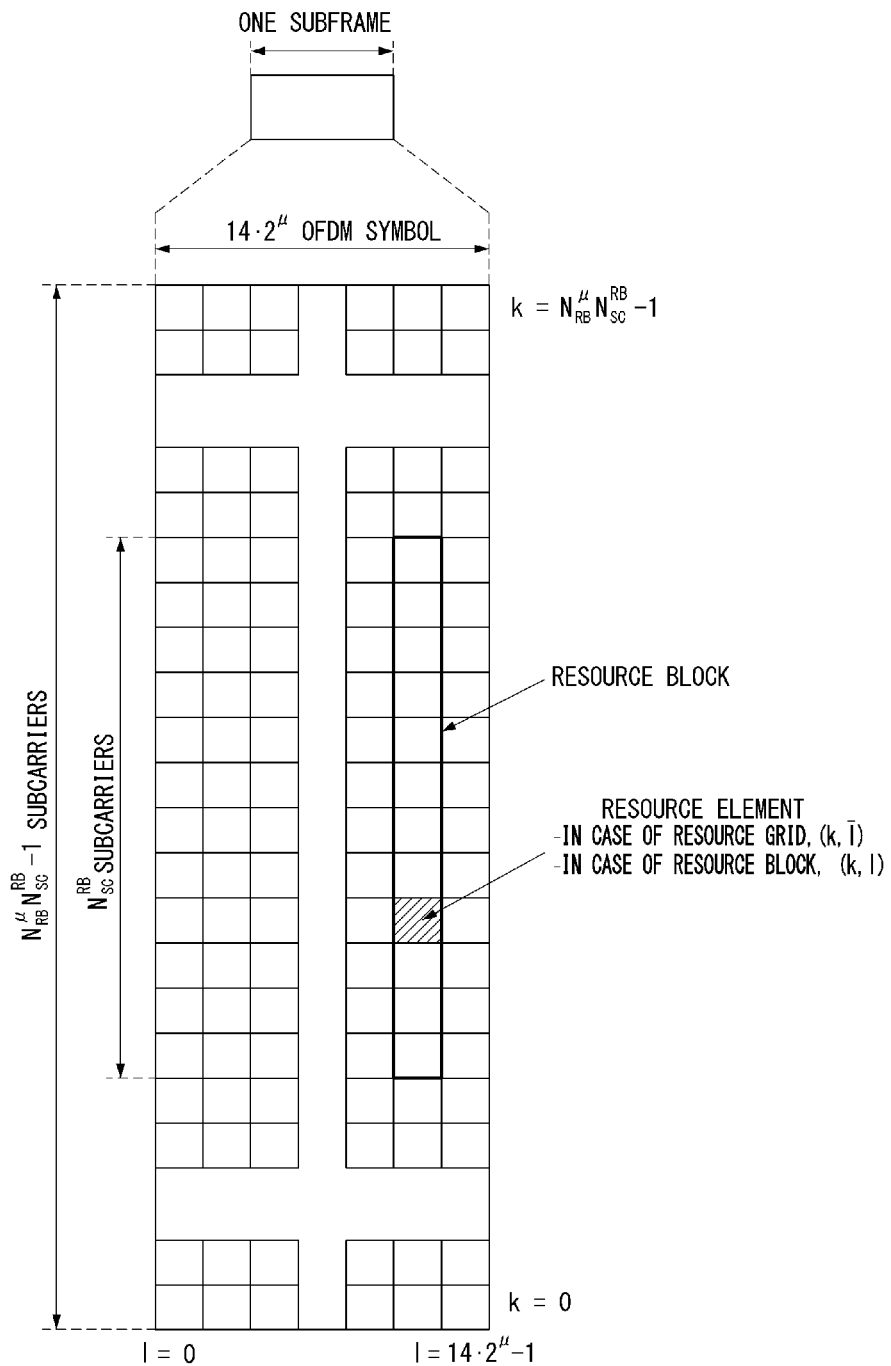
FIG. 3 illustrates an example of a resource grid supported in the wireless communication system to which the method proposed in the present specification may be applied.

FIG. 3 illustrates an example of a resource grid supported in a wireless communication system to which a method proposed by the present disclosure may be implemented.

Referring to FIG. 3, a resource grid is composed of $N_{RB}^\mu N_{sc}^{RB}$ subcarriers in a frequency domain, each subframe composed of 14·2μ OFDM symbols, but the present disclosure is not limited thereto.

In NR system, a transmitted signal is described by one or more resource grids including $N_{RB}^\mu N_{sc}^{RB}$ subcarriers and $2^\mu N_{symb}^{(\mu)}$ OFDM symbols. Here, $N_{RB}^\mu \leq N_{RB}^{max,\mu}$. The $N_{RB}^{max,\mu}$ represents a maximum transmission bandwidth, and this may be changed between uplink and downlink as well as numerologies.

In this case, as shown in FIG. 3, a single resource grid may be configured for numerology μ and antenna port p.

Figure 4:
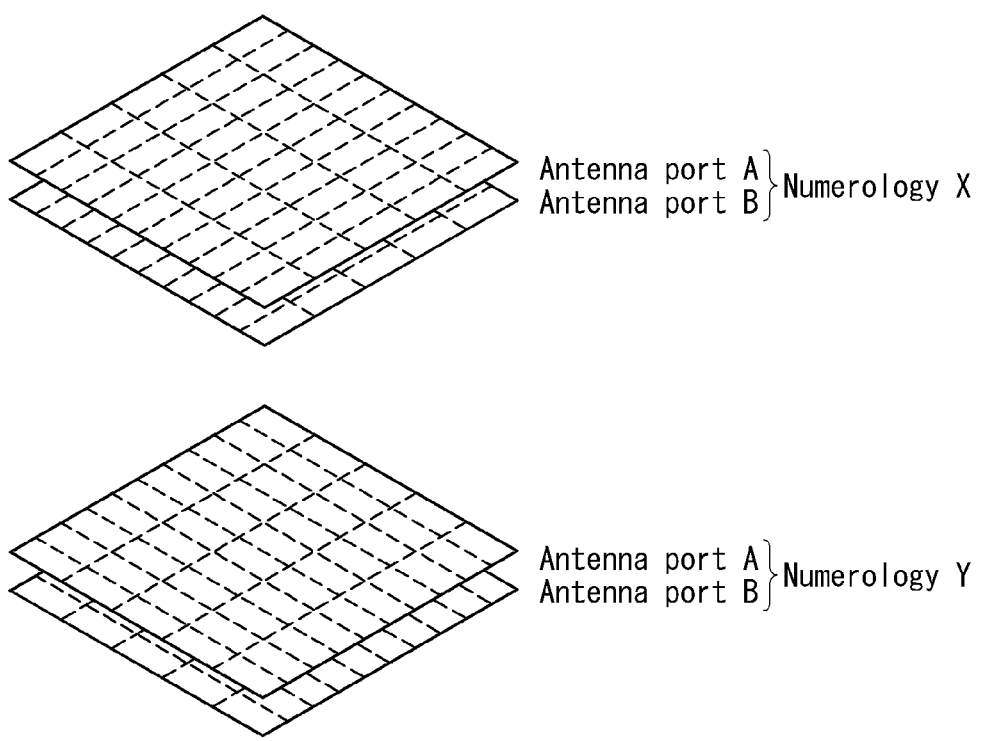
FIG. 4 illustrates examples of resource grids for each antenna port and numerology to which the method proposed in the present disclosure may be applied.

FIG. 4 illustrates examples of resource grids for each antenna port and numerology to which the method proposed in the present disclosure may be applied.

TABLE 2

| | Slot configuration | | | | | |
|---|---|---|---|---|---|---|
| | 0 | | | 1 | | |
| μ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | Slot configuration | | | | | |
|---|---|---|---|---|---|---|
| | 0 | | | 1 | | |
| μ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on Each element of resource grid for numerology μ and antenna port p may be indicated by a resource element, and uniquely distinguished by an index pair (k,l) Here, $k=0, \ldots, N_{RB}^\mu N_{sc}^{RB}-1$ is an index on a frequency domain, and $l=0, \ldots, 2^\mu N_{symb}^{(\mu)}-1$ indicates a symbol position in a subframe. In a slot, when a resource element is indicated, an index pair (k,l) is used. Here, $l=0, \ldots, N_{symb}^{(\mu)}-1$.

Resource element (k,l) for numerology μ and antenna port p corresponds to a complex value $a_{k,l}^{(p,\mu)}$. In the case that there is no risk of confusion or in the case that a specific antenna port or numerology is not specified, indexes μ and P may be dropped, and as a result, the complex value may become $a_{k,l}^{(p)}$ or $a_{k,l}$.

In addition, a physical resource block is defined by $N_{sc}^{RB}=12$ consecutive subcarriers in a frequency domain.

On a frequency domain, numbers of 0 to $N_{RB}^\mu-1$ are designated to physical resources. At this time, the relation between physical resource block number $n_{PRB}$ and resource elements (k,l) are given by Equation 1.

$$n_{PRB} = \left\lfloor \frac{k}{N_{sc}^{RB}} \right\rfloor \quad \text{[Equation 1]}$$

In addition, with respect to a carrier part, a UE may be configured to receive or transmit using a subset of a resource grid only. At this time, numbers of 0 to $N_{URB}^\mu-1$ are designated to a set of a resource block configured to receive or transmit by a UE on a frequency domain.

Hereinafter, before describing the methods proposed in the present disclosure in detail, the contents directly/indirectly related to the methods proposed in the present disclosure are described briefly.

In next generation communication such as 5G, New Rat (NR), and the like, as more communication devices require greater communication capacity, the need of mobile broadband communication more advanced than the conventional RAT (radio access technology) has been issued.

Also, massive MTC (Machine Type Communications) technology that provides various services anywhere and at any time by connecting a plurality of devices and things is one of main issues which will be considered in next generation communication.

Furthermore, a communication system design or structure considering service and/or UE susceptible to reliability and latency has been discussed.

As such, the introduction of the next generation radio access technology (RAT) has been discussed, considering enhanced mobile broadband (eMBB) communication, massive MTC (mMTC), URLLC (Ultra-Reliable and Low Latency Communication), and the like, and the corresponding technology will be referred to as 'New RAT (NR)' in the present disclosure, for the convenience of description.

Self-Contained Subframe Structure

Figure 5:
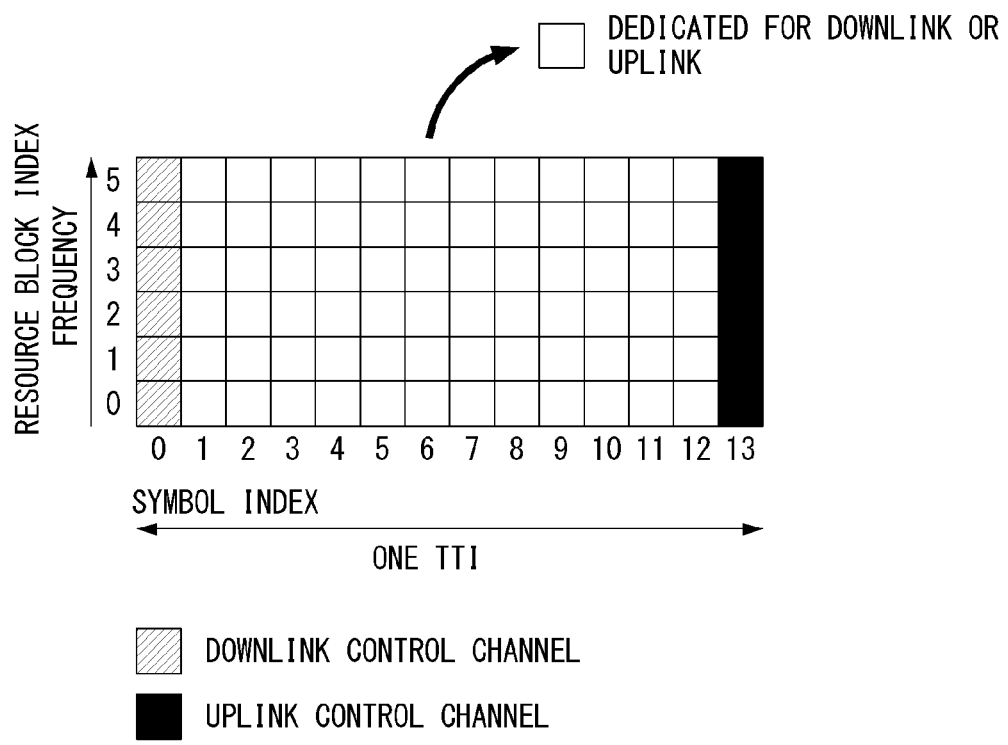
FIG. 5 illustrates a self-contained subframe structure to which the present invention may be applied.

FIG. 5 illustrates a self-contained subframe structure to which the present invention may be applied.

In TDD system, in order to minimize data transmission delay, the self-contained subframe structure as shown in FIG. 4 has been considered in 5. Generation (5G) new RAT.

The shaded area (symbol index 0) in FIG. 5 shows a downlink (DL) control region, and the dark area (symbol index 13) shows an uplink (UL) control region. The area not marked may be used for a DL data transmission or a UL data transmission. In the characteristics of such a structure, a DL transmission and a UL transmission may be sequentially progressed in a subframe, a DL data may be transmitted and a UL ACK/NACK may be received in a subframe. Consequently, a time required for retransmitting data is reduced when a data transmission error occurs, and owing to this, the latency till the last data forwarding may be minimized.

In such a self-contained subframe structure, a time gap is required for a process that an eNB and a UE switch from a transmission mode to a reception mode or a process that an eNB and a UE switch from a reception mode to a transmission mode. For this, a part of OFDM symbols on the timing switching from DL to UL may be configured as GP in the self-contained subframe structure.

Feedback of Channel State Information (CSI)

In a 3GPP LTE/LTE-A system, user equipment (UE) is defined to report channel state information (CSI) to a base station (BS or eNB).

The CSI collectively refers to information that can indicate the quality of a radio channel (or referred to as a link) formed between the UE and the antenna port. For example, a rank indicator (RI), a precoding matrix indicator (PMI), a channel quality indicator (CQI), and the like correspond to the information.

Here, the RI represents rank information of a channel, which means the number of streams received by the UE through the same time-frequency resource. Since this value is determined depending on the long term fading of the channel, the value is fed back from the UE to the BS with a period usually longer than the PMI and the CQI. The PMI is a value reflecting a channel space characteristic and represents a preferred precoding index preferred by the UE based on a metric such as signal-to-interference-plus-noise ratio (SINR). The CQI is a value representing the strength of the channel, and generally refers to a reception SINR that can be obtained when the BS uses the PMI.

In the 3GPP LTE/LTE-A system, the BS configures a plurality of CSI processes to the UE and may receive CSI for each process. Here, the CSI process is constituted by a CSI-RS for signal quality measurement from the BS and a CSI-interference measurement (CSI-IM) resource for interference measurement.

Reference Signal (RS) Virtualization

In mmW, a PDSCH may be transmitted in only one analog beam direction at one time by analog beamforming. In this case, data transmission is available from an eNB to a small number of UEs in the corresponding direction. Therefore, on occasion demands, by differently configuring an analog beam direction for each antenna port, data transmission may be performed to multiple UEs in several analog beam directions simultaneously.

Figure 6:
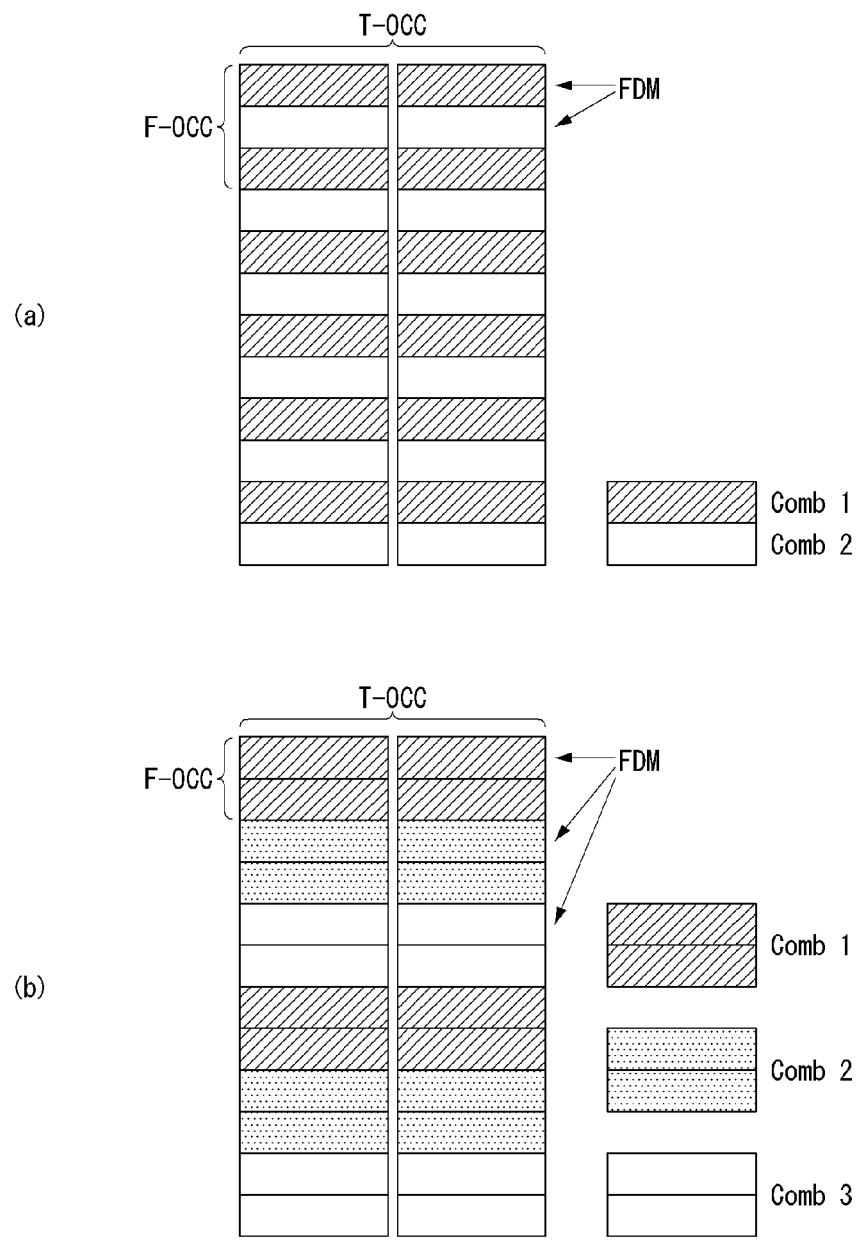
FIG. 6 illustrates an example of a mapping pattern of a demodulation reference signal to which the method proposed in the present disclosure may be applied.

FIG. 6 illustrates an example of a mapping pattern of a demodulation reference signal to which the method proposed in the present disclosure may be applied.

Referring to FIG. 6, a demodulation reference signal for demodulating data in NR may be classified into type 1 and type 2 depending on the mapping format, and may be mapped to one or two symbols.

Particularly, in NR, a demodulation reference signal may be classified into Front load DMRS and additional DMRS. The Front load DMRS may be located at a front symbol of a slot for fast decoding, and may occupy one or two symbols indicated by Downlink Control Information (DCI) and/or RRC.

In the case of slot-based scheduling, in the Front load DMRS, the first DMRS is located at the third or fourth symbol indicated by a Physical Broadcast Channel (PBCH), which is a broadcast channel.

In the case of non-slot-based scheduling, in the Front load DMRS, the first DMRS is located at the first symbol of PDSCH/PUSCH.

In the case of fast speed UE, the additional DMRS may be configured, and located around middle/the last symbol.

The additional DMRS, in the case that the Front load DMRS is configured at one symbol, may occupy the symbol equally spread over 0, 1, 2 or 3 symbols. In the case that the Front load DMRS is configured at two symbols, the additional DMRS may occupy zero or two symbols.

The Front load DMRS may have two mapping types (type 1 and type 2) as shown in FIGS. 6(a) and 6(b), and may be mapped according to the type indicated by RRC between two mapping types.

Hereinafter, (a) is referred to as type 1, and (b) is referred to as type 2.

Both of type 1 and type 2 may be mapped to one or two symbols.

As shown in FIG. 6(a), in the case that a DMRS is mapped to one symbol in type 1, F-CDM (Frequency-Code Division Multiplexing) and FDM (Frequency Division Multiplexing) of length 2 on frequency axis may be used for multiplexing maximum four antenna ports, and in the case that the additional DMRS is not configured, the RS density of each antenna port per Resource Block (RB) is 6 REs.

In type 1, in the case that a DMRS is mapped to two symbols, F-CDM and FDM of length 2 on frequency axis may be used for multiplexing maximum eight antenna ports, and T-CDM of length 2 on time axis may be used.

In the case that the additional DMRS is not configured, the RS density of each antenna port per Resource Block (RB) is 8 REs.

As shown in FIG. 6(b), in the case that a DMRS is mapped to one symbol in type 2, F-CDM (Frequency-Code Division Multiplexing) and FDM (Frequency Division Multiplexing) of length 2 on frequency axis may be used for multiplexing maximum six antenna ports, and in the case that the additional DMRS is not configured, the RS density of each antenna port per Resource Block (RB) is 4 REs.

In type 2, in the case that a DMRS is mapped to two symbols, F-CDM and FDM of length 2 on frequency axis may be used for multiplexing maximum twelve antenna ports, and T-CDM of length 2 on time axis may be used.

In the case that the additional DMRS is not configured, the RS density of each antenna port per Resource Block (RB) is 8 REs.

Hereinafter, a mapping method for transmitting a DMRS for demodulating data through an antenna port and a method for determining a power ratio between a DMRS and data will be described in detail.

In LTE system, a power of a physical shared channel (e.g., physical downlink shared channel; PDSCH) is not separately signaled to a UE, but defined by scaling in the scheme configured for a power of a DMRS.

For example, in the case of Rand 2 or lower in LTE, it may be assumed that a transmission power of DMRS is 3 dB boosted in comparison with a transmission power of data (i.e., the transmission powers of data and DMRS are the same), and otherwise, a transmission power of DMRS is 3 dB boosted in comparison with a transmission power of data.

Also, in NR, a power ratio between a DMRS and data (PDSCH or PUSCH (physical uplink shared channel)) may be changed depending on a multiplexing method (e.g., FDM, T-CDM, F-CDM and TDM) of an antenna port (hereinafter, port) for transmitting a DMRS and/or a mapping type.

For example, the power ratio between a DMRS and data may be changed depending on which multiplexing method for a port of the DMRS is preferentially applied or whether the mapping type of DMRS is type I or type II.

Hereinafter, in the case that the present invention is applied for transmitting a PDSCH, according to the proposal of the present invention, an eNB may configure a power ratio between a DMRS and data and transmit the DMRS and the data to a UE, and the UE may perform a data demodulation by assuming the transmitted power ratio.

Alternatively, in the case that the present invention is applied for transmitting a PDSCH, according to the proposal of the present invention, a UE may configure a power ratio between a DMRS and data and transmit the DMRS and the data to an eNB, and the eNB may perform a data demodulation by assuming the transmitted power ratio.

In addition, in the present disclosure, as shown in FIGS. 6(a) and 6(b), a mapping in comb form may mean a form to which a DMRS is mapped with a uniform symbol interval on frequency axis, and in the case that the CDM method is used on frequency axis and/or time axis, the mapping in the comb form may be the same as the form to which a group of CDMed antenna ports is mapped.

That is, the comb may represent a group of antenna ports in which antenna ports for a DMRS transmission are mapped through the FDM method on time axis, and in the case that the CDM method is used on frequency axis and/or time axis, the comb may be used in the same meaning as a group of CDMed ports.

Hereinafter, the CDM method on frequency axis is referred to as F-CDM, and the CDM method on time axis is referred to as T-CDM.

Power Ratio in DMRS Type 1

First Embodiment

Hereinafter, in the first embodiment, a method in which ports for a transmission of DMRS are multiplexed using the FDM method first is described in detail.

In the case that ports of DMRS are defined using the FDM method first, as the number of ports increases, the ports may be multiplexed using the FDM method first, and in the case that all of resources for the FDM method are used, the ports may be multiplexed using the CDM method on time axis or frequency axis.

For example, each of antenna ports 1 and 2 for transmitting a DMRS in type 1 shown in FIG. 6(a) may be defined by using combs 1 and 2, respectively.

Port 3 may be distinguished from port 1 using T-CDM/F-CDM method in comb 1, and port 4 may be distinguished from port 1 using T-CDM/F-CDM method in comb 2.

In the case that FMR ports are multiplexed using the FDM method first, when there is one port indicated to a UE, a transmission power of DMRS may be 3 dB power boosted in comparison with a transmission power of data using the remaining power of comb, not the comb in which the DMRS is transmitted.

In this case, when data or other reference signal (e.g., sounding reference signal (SRS) or channel state information (CSI)-reference signal (RS)) is transmitted in the remaining comb, since it is unable to use the power of remaining comb, 0 dB power boosted is attained.

That is, only in the case that data or other reference signal is not transmitted in the remaining comb, a transmission power of DMRS may be 3 dB power boosted in comparison with a transmission power of data.

Whether to transmit data in the remaining comb may be informed through Rate Matching information of data or downlink control information (DCI) transmitted from an eNB to a UE. Alternatively, data or other reference signal may not always be mapped to the symbol in which a DMRS is mapped, and in this case, a transmission power of DMRS may be 3 dB boosted.

For example, in the case that a size of slot is small (i.e., a slot is constructed by the number of n symbols or less (e.g., mini slot or n=4)) or the number of symbols related to data is a specific number or less, since the number of REs itself for transmitting data is in short, data may be multiplexed on frequency axis in the symbol to which a DMRS is mapped always and transmitted, and in this case, a transmission power of DMRS may be 0 dB boosted in comparison with a transmission power of data. In the other cases, by assuming that data is not transmitted always in the symbol to which a DMRS is transmitted, a transmission power of DMRS may be 3 dB boosted.

That is, through the same resource among a group of antenna ports for transmitting a DMRS, comb 1 or comb 2 which is a group of antenna ports for transmitting a DMRS may be transmitted with being multiplexed with data or other reference signal based on the number of symbols which are related to data.

For example, in the case that the number of symbols allocated for transmitting data is two, data is transmitted to a group among two groups of antenna ports, and only a demodulation reference signal, without data, may be transmitted to the remaining antenna port group.

In the case that the number of symbols allocated for transmitting data is three or more, only a demodulation reference signal, without data, may be transmitted to all of two antenna port groups.

In the case that data or other reference signal is multiplexed together in the symbol to which a DMRS is mapped, a transmission power of DMRS may be 0 dB power boosted.

In other cases, it may be assumed that other data or other reference signal is not multiplexed in the symbol to which a DMRS is mapped. In this case, a transmission power of DMRS may be 3 dB boosted in comparison with a transmission power of data or whether to boost may be determined depending on a rate mapping of data.

In the case that there are two or more ports indicated to a UE by an eNB, since the power of the remaining comb except the comb to which a specific port is mapped may be used, a transmission power of DMRS may be 3 dB boosted always.

That is, depending on the number of antenna groups not transmitted with data among the groups of antenna ports to which a DMRS is transmitted, whether to boost a transmission power of DMRS or a boosting value may be determined.

For example, in the case that the number of antenna groups not transmitted with data described above is '2', a transmission power of DMRS may be 3 dB boosted, and in the case that the number of antenna groups not transmitted with data described above is '1', a transmission power of DMRS may be 0 dB boosted.

The first embodiment may be applied to both of the cases that front load DMRS is mapped to 1 or 2 symbols.

Second Embodiment

Hereinafter, in the second embodiment, a method in which ports for a transmission of DMRS are multiplexed using the F-CDM method first is described in detail.

In the case that ports of DMRS are defined using the F-CDM method first, as the number of ports increases, ports may be multiplexed using the F-CDM method first, and in the case that all of resources for the F-CDM method are used, the ports may be multiplexed using the FDM method.

For example, each of antenna ports 1 and 2 for transmitting a DMRS in type 1 shown in FIG. 6(a) may be multiplexed by using orthogonal cover code (OCC) (e.g., OCC [1 1] and [1 −1]) on frequency axis in comb 1, and each of ports 3 and 4 may be multiplexed by using OCC on frequency axis in comb 2.

In the case that DMRS port is defined using the F-CDM method first, when the number of ports indicated to a UE is two or less, a transmission power of DMRS may be 3 dB power boosted in comparison with a transmission power of data using the remaining power of comb, not the comb in which the DMRS is transmitted.

In this case, when data or other reference signal is transmitted in the remaining comb, since it is unable to use the power of remaining comb, 0 dB power boosted is attained.

That is, only in the case that data or other reference signal is not transmitted in the remaining comb, a transmission power of DMRS may be 3 dB power boosted in comparison with a transmission power of data.

Whether to transmit data in the remaining comb may be informed through Rate Matching information of data or DCI transmitted from an eNB to a UE. Alternatively, data or other reference signal may not always be mapped to the symbol in which a DMRS is mapped, and in this case, a transmission power of DMRS may be 3 dB boosted.

For example, in the case that a size of slot is small (i.e., a slot is constructed by the number of n symbols or less (e.g., mini slot or n=4)) or the number of symbols related to data is a specific number or less, since the number of REs itself for transmitting data is in short, data may be multiplexed on frequency axis in the symbol to which a DMRS is mapped always and transmitted, and in this case, a transmission power of DMRS may be 0 dB boosted in comparison with a transmission power of data. In the other cases, by assuming that data is not transmitted always in the symbol to which a DMRS is transmitted, a transmission power of DMRS may be 3 dB boosted.

That is, through the same resource among a group of antenna ports for transmitting a DMRS, comb 1 or comb 2 which is a group of antenna ports for transmitting a DMRS may be transmitted with being multiplexed with data or other reference signal based on the number of symbols which are related to data.

For example, in the case that the number of symbols allocated for transmitting data is two, data is transmitted to a group among two groups of antenna ports, and only a demodulation reference signal, without data, may be transmitted to the remaining antenna port group.

In the case that the number of symbols allocated for transmitting data is three or more, only a demodulation reference signal, without data, may be transmitted to all of two antenna port groups. In the case that data or other reference signal is multiplexed together in the symbol to which a DMRS is mapped, a transmission power of DMRS may be 0 dB power boosted.

In other cases, it may be assumed that other data or other reference signal is not multiplexed in the symbol to which a DMRS is mapped. In this case, a transmission power of DMRS may be 3 dB boosted in comparison with a transmission power of data or whether to boost may be determined depending on a rate mapping of data.

In the case that there are three or more ports indicated to a UE by an eNB, since the power of the remaining comb except the comb to which a specific port is mapped may be used, a transmission power of DMRS may be 3 dB boosted always.

That is, depending on the number of antenna groups not transmitted with data among the groups of antenna ports to which a DMRS is transmitted, whether to boost a transmission power of DMRS or a boosting value may be determined.

For example, in the case that the number of antenna groups not transmitted with data described above is '3', a transmission power of DMRS may be 3 dB boosted, and in the case that the number of antenna groups not transmitted with data described above is '1', a transmission power of DMRS may be 0 dB boosted.

The first embodiment may be applied to both of the cases that front load DMRS is mapped to 1 or 2 symbols, and in the case that front load DMRS is mapped to two symbols, lastly, the T-CDM method may be applied.

The second embodiment may also be applied to a method for multiplexing ports for transmitting a DMRS using the T-CDM method first.

That is, in the case that ports are multiplexed first using the T-CDM method, and all of the resources for using the T-CDM method are used, the ports may be multiplexed in the order of the FDM and the F-CDM. In this case, the power boosting may be applied in the same manner.

Third Embodiment

Hereinafter, in the third embodiment, a method in which ports for a transmission of DMRS are multiplexed using the F-CDM method and the T-CDM method first is described in detail.

In the case that ports of DMRS are defined using the F-CDM method and the T-CDM method first, as the number of ports increases, ports may be multiplexed using the F-CDM method and the T-CDM method first, and in the case that all of resources for the F-CDM method and the T-CDM method are used, the ports may be multiplexed using the FDM method on time axis or frequency axis.

For example, each of antenna ports 1, 2, 3 and 4 for transmitting a DMRS in type 1 shown in FIG. 6(a) may be multiplexed by using OCC [1 1], [1, −1] on frequency axis in comb 1, and OCC [1 1], [1, −1] on time axis in comb 2, and each of ports 5, 6, 7 and 8 may be multiplexed by using OCC on frequency axis and OCC on time axis in comb 2.

In the case that DMRS port is defined using the F-CDM method and the T-CDM method first, when the port indicated to a UE is four or less, a transmission power of DMRS may be 3 dB power boosted in comparison with a transmission power of data using the remaining power of comb, not the comb in which the DMRS is transmitted.

In this case, when data or other reference signal is transmitted in the remaining comb, since it is unable to use the power of remaining comb, 0 dB power boosted is attained.

That is, only in the case that data or other reference signal is not transmitted in the remaining comb, a transmission power of DMRS may be 3 dB power boosted in comparison with a transmission power of data.

Whether to transmit data in the remaining comb may be informed through Rate Matching information of data or DCI transmitted from an eNB to a UE. Alternatively, data or other reference signal may not always be mapped to the symbol in which a DMRS is mapped, and in this case, a transmission power of DMRS may be 3 dB boosted.

For example, in the case that a size of slot is small (i.e., a slot is constructed by the number of n symbols or less (e.g., mini slot or n=4)) or the number of symbols related to data is a specific number or less, since the number of REs itself for transmitting data is in short, data may be multiplexed on frequency axis in the symbol to which a DMRS is mapped always and transmitted, and in this case, a transmission power of DMRS may be 0 dB boosted in comparison with a transmission power of data. In the other cases, by assuming that data is not transmitted always in the symbol to which a DMRS is transmitted, a transmission power of DMRS may be 3 dB boosted.

That is, through the same resource among a group of antenna ports for transmitting a DMRS, comb 1 or comb 2 which is a group of antenna ports for transmitting a DMRS may be transmitted with being multiplexed with data or other reference signal based on the number of symbols which are related to data.

For example, in the case that the number of symbols allocated for transmitting data is two, data is transmitted to a group among two groups of antenna ports, and only a demodulation reference signal, without data, may be transmitted to the remaining antenna port group.

In the case that the number of symbols allocated for transmitting data is three or more, only a demodulation reference signal, without data, may be transmitted to all of two antenna port groups. In the case that data or other reference signal is multiplexed together in the symbol to which a DMRS is mapped, a transmission power of DMRS may be 0 dB power boosted.

In other cases, it may be assumed that other data or other reference signal is not multiplexed in the symbol to which a DMRS is mapped. In this case, a transmission power of DMRS may be 3 dB boosted in comparison with a transmission power of data or whether to boost may be determined depending on a rate mapping of data.

In the case that there are two or more ports indicated to a UE by an eNB, since the power of the remaining comb except the comb to which a specific port is mapped may be used, a transmission power of DMRS may be 3 dB boosted always.

That is, depending on the number of antenna groups not transmitted with data among the groups of antenna ports to which a DMRS is transmitted, whether to boost a transmission power of DMRS or a boosting value may be determined.

For example, in the case that the number of antenna groups not transmitted with data described above is '2', a transmission power of DMRS may be 3 dB boosted, and in the case that the number of antenna groups not transmitted with data described above is '1', a transmission power of DMRS may be 0 dB boosted.

The third embodiment may be applied to both of the cases that front load DMRS is mapped to 1 or 2 symbols.

Figure 7:
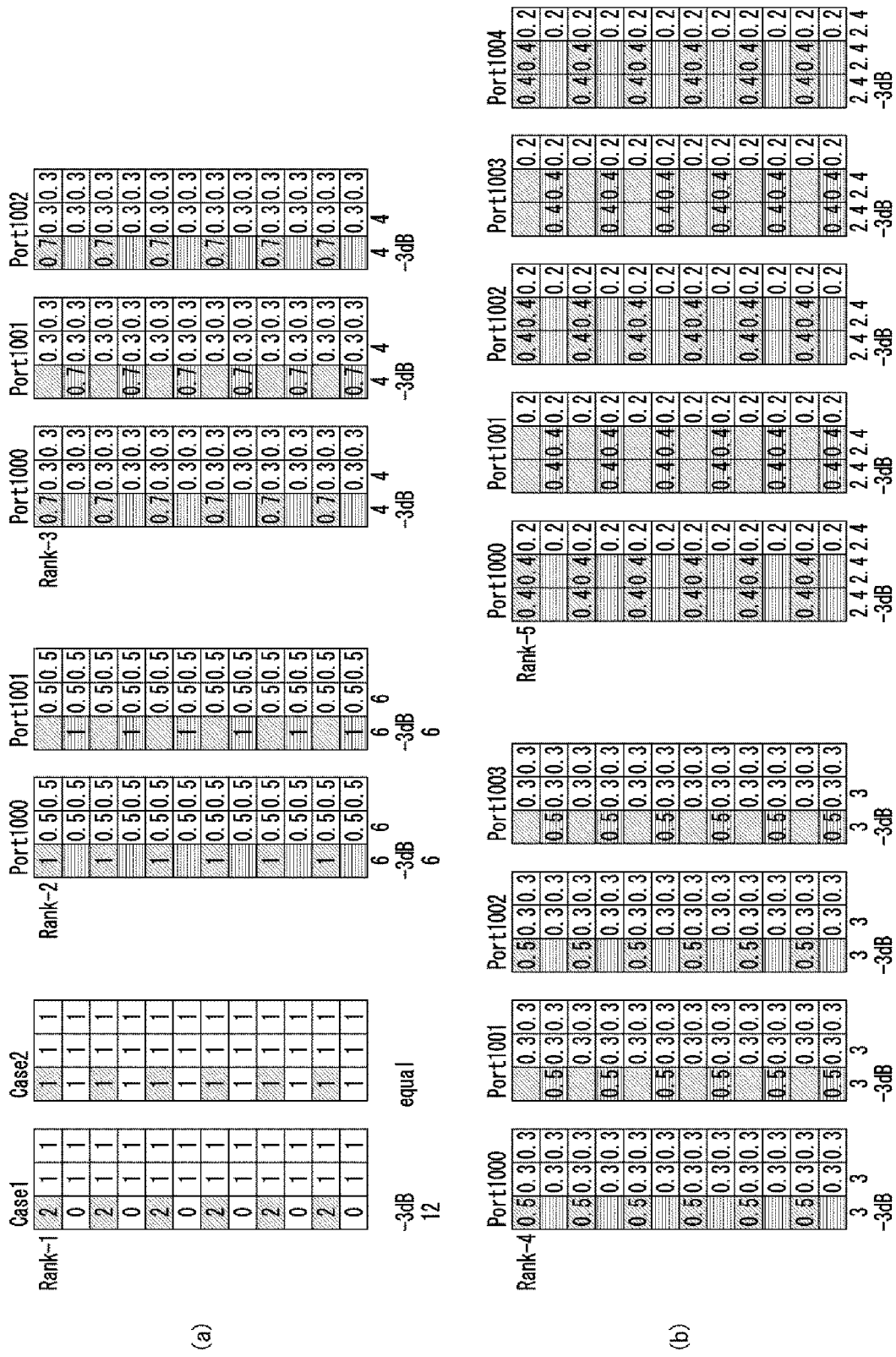
FIGS. 7 to 9 are diagrams illustrating an example of a transmission power when a demodulation reference signal is mapped according to type 1 proposed in the present disclosure.
Figure 8:
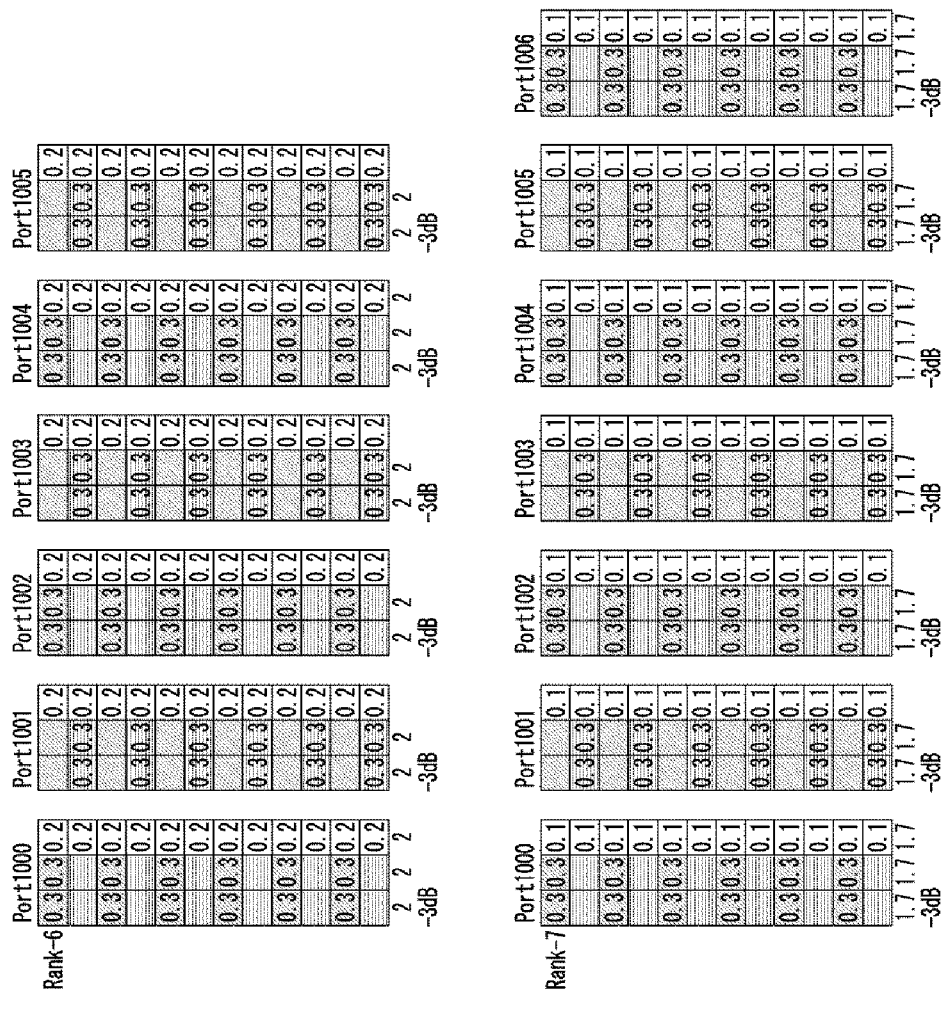
Figure 9:
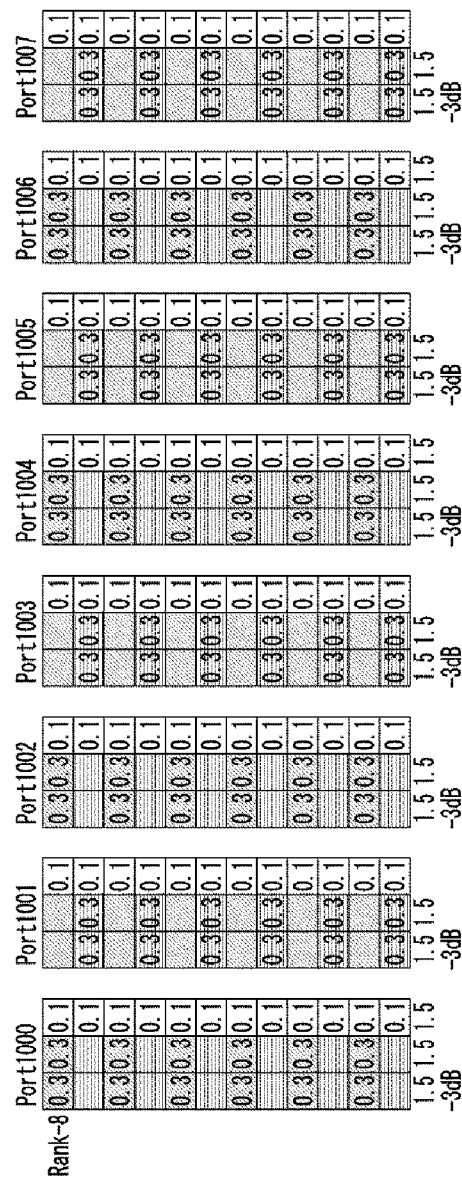

FIGS. 7 to 9 are diagrams illustrating an example of a transmission power when a demodulation reference signal is mapped according to type 1 proposed in the present disclosure.

Particularly, FIGS. 7 to 9 illustrate an example of a transmission power of a DMRS in comparison with data when antenna ports for transmitting a DMRS are multiplexed using the FDM first in type 1.

Referring to FIG. 7 to FIG. 9, using the first to third embodiments, it is identified that a transmission power of DMRS is 3 dB boosted.

In FIG. 7 to FIG. 9, the non-shaded RE denotes an RE to which data or other reference signal is transmitted, and the shaded RE denotes an RE to which a DMRS set to each UE is transmitted.

The number denoted in each RE means a transmission power of the corresponding RE in a specific port (FIG. 7 to FIG. 9 show ports 1000 to 1011, for example.).

FIG. 7(a) shows an example of the case of rank 1 to rank 3, and FIG. 7(b) shows an example of the case of rank 4 and rank 5.

FIG. 8(a) shows an example of rank 6, FIG. 8(b) shows an example of rank 7, and FIG. 9 shows an example of rank 8.

Power Ratio in DMRS Type 2

Fourth Embodiment

Hereinafter, in the fourth embodiment to the seventh embodiment, when a DMRS is mapped according to type 2 as shown in FIG. 6(b), a multiplexing method of ports for transmitting a DMRS and a power boosting will be described in detail.

In the fourth embodiment, for type 2, a method in which ports for a transmission of DMRS are multiplexed using the FDM method first is described in detail.

In the case that ports of DMRS are defined using the FDM method first, as the number of ports increases, ports may be multiplexed using the FDM method first, and in the case that all of resources for the FDM method are used, the ports may be multiplexed using the CDM method on time axis or frequency axis.

For example, each of ports 1, 2 and 3 in type 2 shown in FIG. 6(b) may be defined by using combs 1, 2 and 3, and port 3 may be distinguished from port 1 by using the T-CDM/F-CDM method in comb 1.

In addition, port 4 may be distinguished from port 2 by using the T-CDM/F-CDM method in comb 2, and port 6 may be distinguished from port 3 by using the T-CDM/F-CDM method in comb 3.

In the case that DMRS port is defined using the FDM method first, when there is one port indicated to a UE, a transmission power of DMRS may be 3 dB or 4.77 dB (i.e., three times) power boosted in comparison with a transmission power of data using the remaining power of comb, not the comb in which the DMRS is transmitted.

In this case, when data or other reference signal is transmitted in the all remaining comb, since it is unable to use the power of remaining comb, 0 dB power boosted is attained.

In the case that data or other reference signal is not transmitted only in one comb among all of the remaining comb, 3 dB power boosting may be applied, and in the case that data or other reference signal is not transmitted in all of the remaining combs, 4.77 dB (i.e., three times) power boosting may be applied.

Whether to transmit data in the remaining comb may be informed through Rate Matching information of data or DCI transmitted from an eNB to a UE. Alternatively, by assuming that data or other reference signal may not always be mapped to the symbol in which a DMRS is mapped, it is assumed that a transmission power of DMRS may be 4.77 dB boosted.

For example, in the case that a size of slot is small (i.e., a slot is constructed by the number of n symbols or less (e.g., mini slot or n=4)) or the number of symbols related to data is a specific number or less, since the number of REs itself for transmitting data is in short, data may be multiplexed on frequency axis in the symbol to which a DMRS is mapped always and transmitted, and in this case, a transmission power of DMRS may be 0 dB boosted in comparison with a transmission power of data. In the other cases, by assuming that data is not transmitted always in the symbol to which a DMRS is transmitted, a transmission power of DMRS may be 3 dB boosted.

That is, through the same resource among a group of antenna ports for transmitting a DMRS, comb 1 or comb 2 which is a group of antenna ports for transmitting a DMRS may be transmitted with being multiplexed with data or other reference signal based on the number of symbols which are related to data.

For example, in the case that the number of symbols allocated for transmitting data is two, data is transmitted to a group among two groups of antenna ports, and only a demodulation reference signal, without data, may be transmitted to the remaining antenna port group.

In the case that the number of symbols allocated for transmitting data is three or more, only a demodulation reference signal, without data, may be transmitted to all of two antenna port groups. In the case that data or other reference signal is multiplexed together in the symbol to which a DMRS is mapped, a transmission power of DMRS may be 0 dB power boosted.

In other cases, it may be assumed that other data or other reference signal is not multiplexed in the symbol to which a DMRS is mapped. In this case, by using the power of the remaining comb additionally, a transmission power of DMRS may be 4.77 dB boosted in comparison with a transmission power of data or whether to boost may be determined depending on a rate mapping of data.

That is, depending on the number of antenna groups not transmitted with data among the groups of antenna ports to which a DMRS is transmitted, whether to boost a transmission power of DMRS or a boosting value may be determined.

For example, in the case that the number of antenna groups not transmitted with data described above is '3', a transmission power of DMRS may be 4.77 dB boosted, and in the case that the number of antenna groups is '2', a transmission power of DMRS may be 3 dB boosted. And, in the case that the number of antenna groups is '1', a transmission power of DMRS may be 0 dB boosted.

In the case that DMRS ports are multiplexed using the FDM method first, and there are two ports indicated by an eNB, the two ports may transmit a DMRS using different comb, respectively.

Accordingly, since the power of the remaining comb except one comb to which a specific port is mapped is used always, in the case of a DMRS of type 2, at least 3 dB power boosting may be always available.

In the case that data or other reference signal is transmitted to the remaining comb in which a DMRS is not configured, since the transmission power of the RE to which the data or other reference signal is mapped may not be used, 3 dB power boosting may be available.

In the case that data or other reference signal is not mapped to the remaining comb, since the power of the remaining comb may be used, by using the power of the remaining comb additionally, a transmission power of DMRS may be 4.77 dB boosted in comparison with a transmission power of data.

Whether to transmit data or other reference signal in the remaining comb may be informed through Rate Matching information of data or DCI transmitted from an eNB to a UE. Alternatively, by assuming that data or other reference signal may not always be mapped to the symbol in which a DMRS is mapped, it may be assumed that a transmission power of DMRS may be 4.77 dB boosted.

For example, in the case that a size of slot is small (i.e., a slot is constructed by the number of n symbols or less (e.g., mini slot or n=4)) or the number of symbols related to data is a specific number or less, since the number of REs itself for transmitting data is in short, data may be multiplexed on frequency axis in the symbol to which a DMRS is mapped always and transmitted, and in this case, a transmission power of DMRS may be 0 dB boosted in comparison with a transmission power of data. In the other cases, by assuming that data is not transmitted always in the symbol to which a DMRS is transmitted, a transmission power of DMRS may be 3 dB boosted.

That is, through the same resource among a group of antenna ports for transmitting a DMRS, comb 1 or comb 2 which is a group of antenna ports for transmitting a DMRS may be transmitted with being multiplexed with data or other reference signal based on the number of symbols which are related to data.

For example, in the case that the number of symbols allocated for transmitting data is two, data is transmitted to a group among two groups of antenna ports, and only a demodulation reference signal, without data, may be transmitted to the remaining antenna port group.

In the case that the number of symbols allocated for transmitting data is three or more, only a demodulation reference signal, without data, may be transmitted to all of two antenna port groups.

In the case that data or other reference signal is multiplexed together in the symbol to which a DMRS is mapped, a transmission power of DMRS may be 3 dB power boosted.

That is, depending on the number of antenna groups not transmitted with data among the groups of antenna ports to which a DMRS is transmitted, whether to boost a transmission power of DMRS or a boosting value may be determined.

For example, in the case that the number of antenna groups not transmitted with data described above is '3', a transmission power of DMRS may be 4.77 dB boosted, and in the case that the number of antenna groups is '2', a transmission power of DMRS may be 3 dB boosted. And, in the case that the number of antenna groups is '1', a transmission power of DMRS may be 0 dB boosted.

In other cases, it may be assumed that other data or other reference signal is not multiplexed in the symbol to which a DMRS is mapped. In this case, by using the power of the remaining comb is additionally used, a transmission power of DMRS may be 4.77 dB boosted in comparison with a transmission power of data or whether to boost may be determined depending on a rate mapping of data.

In the case that there are three or more ports indicated to a UE by an eNB, since the power of the remaining comb except the comb to which a specific port is transmitted may be always used, a transmission power of DMRS may be 3 dB boosted always.

The fourth embodiment may also be applied to the case that a DMRS is mapped to two symbols.

Fifth Embodiment

Hereinafter, in the fifth embodiment, in the case of type 2, a method in which ports for a transmission of DMRS are multiplexed using the F-CDM method first is described in detail.

In the case that ports of DMRS are defined using the F-CDM method first, as the number of ports increases, ports may be multiplexed using the F-CDM method first, and in the case that all of resources for the F-CDM method are used, the ports may be multiplexed using the FDM method.

For example, each of antenna ports 1 and 2 in type 2 shown in FIG. 6(b) may be multiplexed by using orthogonal cover code (OCC) (e.g., OCC [1 1] and [1 −1]) on frequency axis in comb 1, and each of ports 3 and 4 may be multiplexed by using OCC on frequency axis in comb 2.

In the case that DMRS port is defined using the F-CDM method first, when the port indicated to a UE by an eNB is two or less, a power boosting may be performed using the same method as the case that there is one port indicated to the UE by the eNB.

In the case that there are three or more and four or less ports indicated to the UE by the eNB, four ports may be transmitted through two combs. Accordingly, since the power of the remaining one comb except the one comb in which a specific port is transmitted may be used, at least 3 dB power boosting may be always applied.

In the case that data or other reference signal is mapped to the remaining comb in which a DMRS is not configured, since the transmission power of the remaining comb to which the data or other reference signal is mapped may not be used, 3 dB power boosting may be available.

In the case that data or other reference signal is not mapped to the remaining comb, by using the power of the remaining comb additionally, 4.77 dB power boosting may be applied.

Whether to transmit data or other reference signal in the remaining comb may be informed through Rate Matching information of data or DCI transmitted from an eNB to a UE. Alternatively, by assuming that data or other reference signal may not always be mapped to the symbol in which a DMRS is mapped, it may be assumed that a transmission power of DMRS may be 4.77 dB boosted.

In the case that a slot size is small, that is, a method for determining a transmission power of a DMRS based on the number of symbols related to data may be applied to the case that there are two ports indicated by the eNB in the fourth embodiment in the same manner.

In the case that the number of ports indicated to a UE is five or more, since the power of all of the remaining combs except the comb in which a specific port is transmitted may be used always, 4.77 dB power boosting may be always applied.

That is, depending on the number of antenna groups not transmitted with data among the groups of antenna ports to which a DMRS is transmitted, whether to boost a transmission power of DMRS or a boosting value may be determined.

For example, in the case that the number of antenna groups not transmitted with data described above is '3', a transmission power of DMRS may be 4.77 dB boosted, and in the case that the number of antenna groups is '2', a transmission power of DMRS may be 3 dB boosted. And, in the case that the number of antenna groups is '1', a transmission power of DMRS may be 0 dB boosted.

The fifth embodiment may also be applied to the case that a DMRS is mapped to two symbols, and in the case that a DMRS is mapped to two symbols, after the FDM method is applied, ports may be multiplexed through the T-CDM method.

The fifth embodiment may also be applied to a method for multiplexing ports for transmitting a DMRS using the T-CDM method first.

That is, in the case that ports are multiplexed first using the T-CDM method, and all of the resources for using the T-CDM method are used, the ports may be multiplexed in the order of the FDM and the F-CDM. In this case, the power boosting may be applied in the same manner.

Sixth Embodiment

Hereinafter, in the sixth embodiment, for type 2, a method in which ports for a transmission of DMRS are multiplexed using the F-CDM method and the T-CDM method first is described in detail.

In the case that ports of DMRS are defined using the F-CDM method and the T-CDM method first, as the number of ports increases, ports may be multiplexed using the F-CDM method and the T-CDM method first, and in the case that all of resources for the F-CDM method and the T-CDM method are used, the ports may be multiplexed using the FDM method on time axis or frequency axis.

For example, each of antenna ports 1, 2, 3 and 4 for transmitting a DMRS in type 2 shown in FIG. 6(b) may be multiplexed by using OCC [1 1], [1, −1] on frequency axis in comb 1, and OCC [1 1], [1, −1] on time axis in comb 2, and each of ports 5, 6, 7 and 8 may be multiplexed by using OCC on frequency axis and OCC on time axis in comb 2, and each of ports 9, 10, 11 and 12 may be multiplexed by using OCC on frequency axis and OCC on time axis in comb 3.

In the case that DMRS port is defined using the F-CDM method and the T-CDM method first, when the port indicated to a UE is four or less, a transmission power of DMRS may be 3 dB or 4.77 dB power boosted in comparison with a transmission power of data using the remaining power of comb, not the comb in which the DMRS is transmitted.

In this case, when data or other reference signal is transmitted in all of the remaining combs, since it is unable to use the power of remaining comb, 0 dB power boosted is attained, and in the case that data or other reference signal is not transmitted in one comb of the remaining combs, a transmission power of DMRS may be 3 dB power boosted by using the power of the comb in which the data or other reference signal is not transmitted.

In addition, in the case that data or other reference signal is not transmitted to all of the remaining combs, by using the power of all of the remaining combs, 4.77 dB power boosting may be applied.

Whether to transmit data or other reference signal in the remaining comb may be informed through Rate Matching information of data or DCI transmitted from an eNB to a UE. Alternatively, by assuming that data or other reference signal may not always be mapped to the symbol in which a DMRS is mapped, it may be assumed that a transmission power of DMRS may be 4.77 dB boosted.

In the case that a slot size is small, that is, a method for determining a transmission power of a DMRS depending on the number of symbols related to data may be applied to the case that there is one port indicated by the eNB in the fourth embodiment in the same manner.

In the case that there are five or more and eight or less ports indicated by the eNB, eight ports may be transmitted through two combs.

Accordingly, since the power of the remaining comb except the one comb in which a specific port is transmitted may be used, in the case of DMRS of type 2, at least 3 dB power boosting may be always available.

In the case that data or other reference signal is mapped to the remaining comb in which a DMRS is not configured, since the transmission power of the remaining comb to which the data or other reference signal is mapped may not be used, 3 dB power boosting may be available.

In the case that data or other reference signal is not mapped to the remaining comb, since the power of the remaining comb may be used, by using the power of the remaining comb additionally, 4.77 dB power boosting may be applied.

Whether to transmit data or other reference signal in the remaining comb may be informed through Rate Matching information of data or DCI transmitted from an eNB to a UE. Alternatively, by assuming that data or other reference signal may not always be mapped to the symbol in which a DMRS is mapped, it may be assumed that a transmission power of DMRS may be 4.77 dB boosted.

That is, depending on the number of antenna groups not transmitted with data among the groups of antenna ports to which a DMRS is transmitted, whether to boost a transmission power of DMRS or a boosting value may be determined.

For example, in the case that the number of antenna groups not transmitted with data described above is '3', a transmission power of DMRS may be 4.77 dB boosted, and in the case that the number of antenna groups is '2', a transmission power of DMRS may be 3 dB boosted. And, in the case that the number of antenna groups is '1', a transmission power of DMRS may be 0 dB boosted.

In the case that a slot size is small, that is, a method for determining a transmission power of a DMRS based on the number of symbols related to data may be applied to the case that there are two ports indicated by the eNB in the fourth embodiment in the same manner.

In the case that the number of ports indicated to a UE by an eNB is nine or more, since the power of all of the remaining combs except the comb in which a specific port is transmitted may be used always, 4.77 dB power boosting may be applied in comparison with a transmission power of data.

The sixth embodiment may also be applied to the case that front load DMRS is mapped to two symbols.

FIGS. 10 to 15 are diagrams illustrating an example of a transmission power when a demodulation reference signal is mapped according to type 2 proposed in the present disclosure.

FIGS. 10 to 15 are diagrams illustrating an example of a transmission power when a demodulation reference signal is mapped according to type 2 proposed in the present disclosure.

Particularly, FIGS. 10 to 15 illustrate an example of a transmission power of a DMRS in comparison with data when antenna ports for transmitting a DMRS are multiplexed using the FDM first in type 2.

Referring to FIG. 10 to FIG. 15, using the first to third embodiments, it is identified that a transmission power of DMRS is 3 dB or 4.8 dB boosted.

In FIG. 10 to FIG. 15, the non-shaded RE denotes an RE to which data or other reference signal is transmitted, and the shaded RE denotes an RE to which a DMRS set to each UE is transmitted.

The number denoted in each RE means a transmission power of the corresponding RE in a specific port (FIG. 10 to FIG. 15 show ports 1000 to 1011, for example.).

Figure 10:
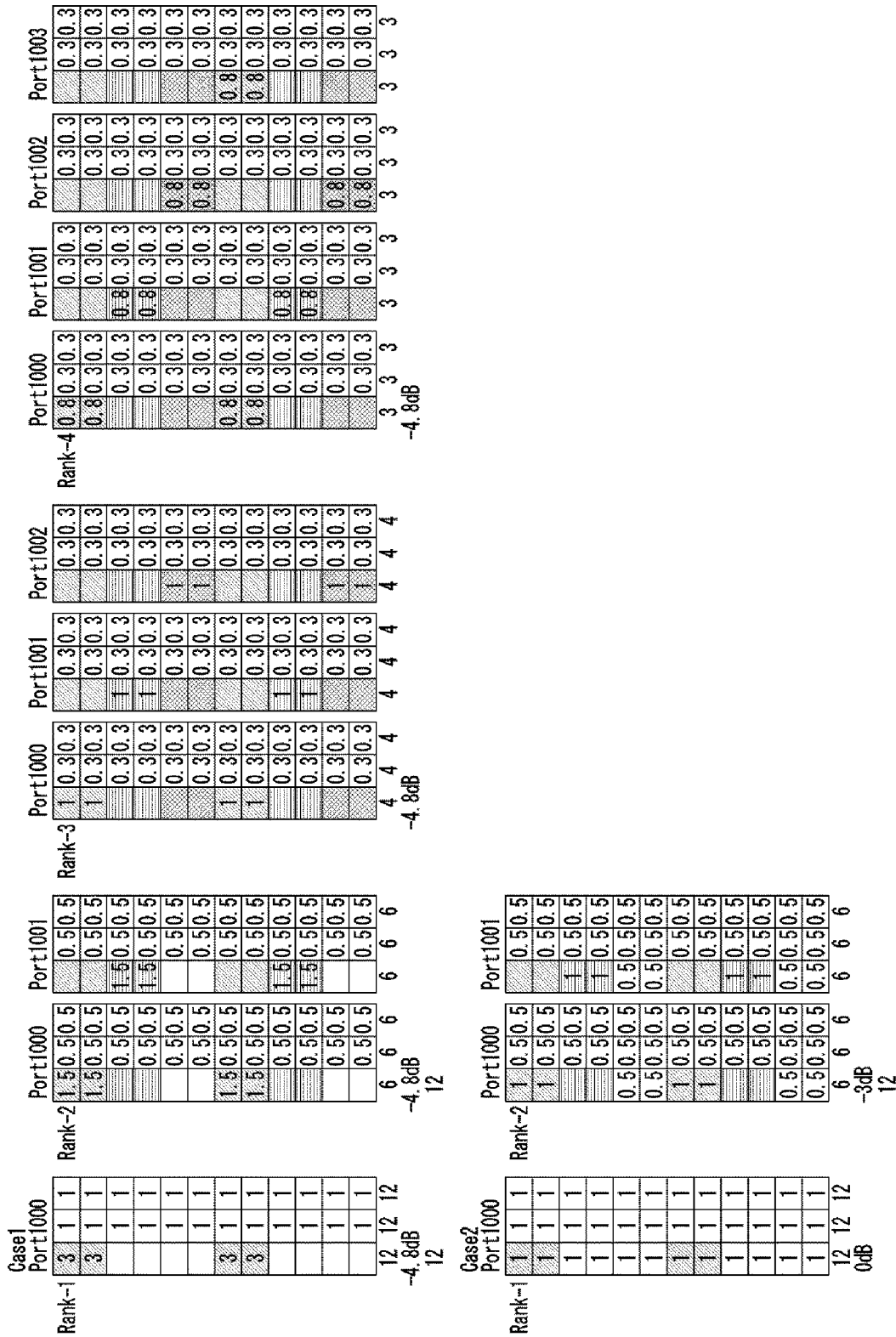
FIGS. 10 to 14 are diagrams illustrating an example of a transmission power when a demodulation reference signal is mapped according to type 2 proposed in the present disclosure.
Figure 11:
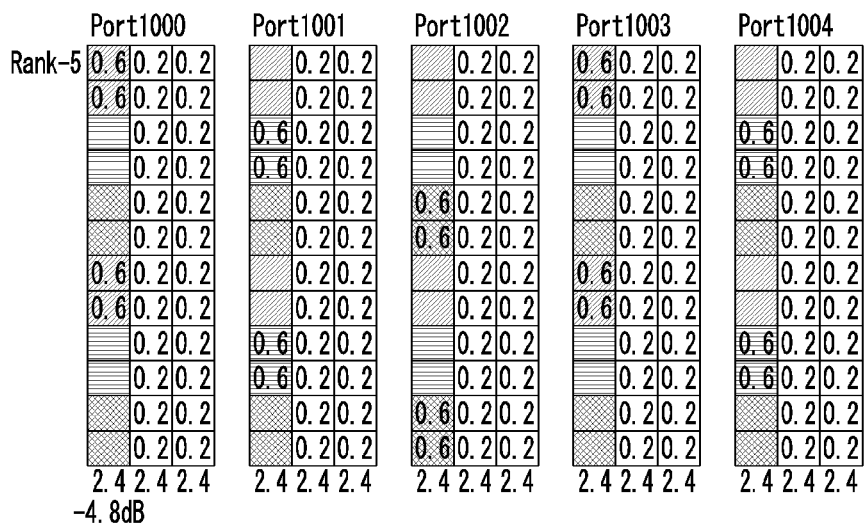
Figure 11:
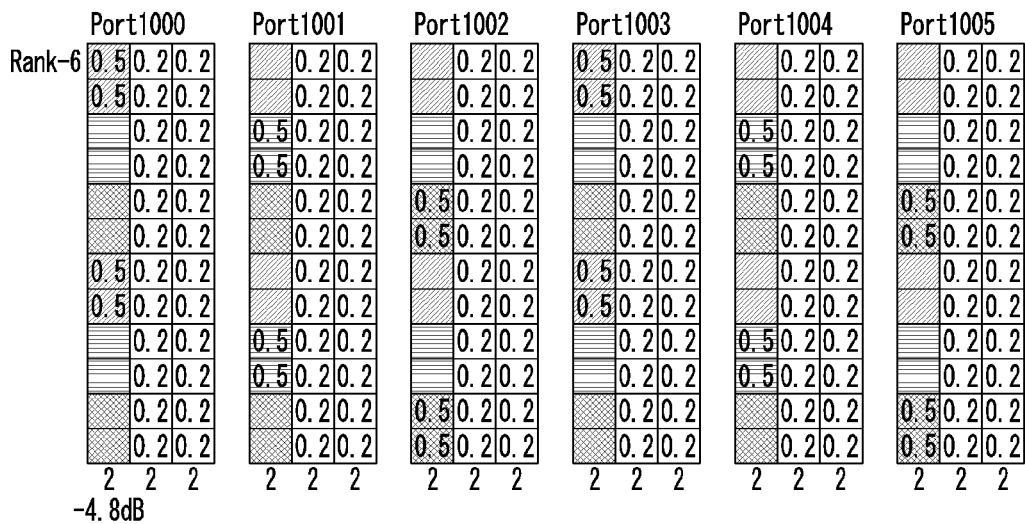

FIG. 10 shows an example of the case of rank 1 to rank 4, and FIG. 11 shows an example of the case of rank 5 and rank 6.

Figure 12:
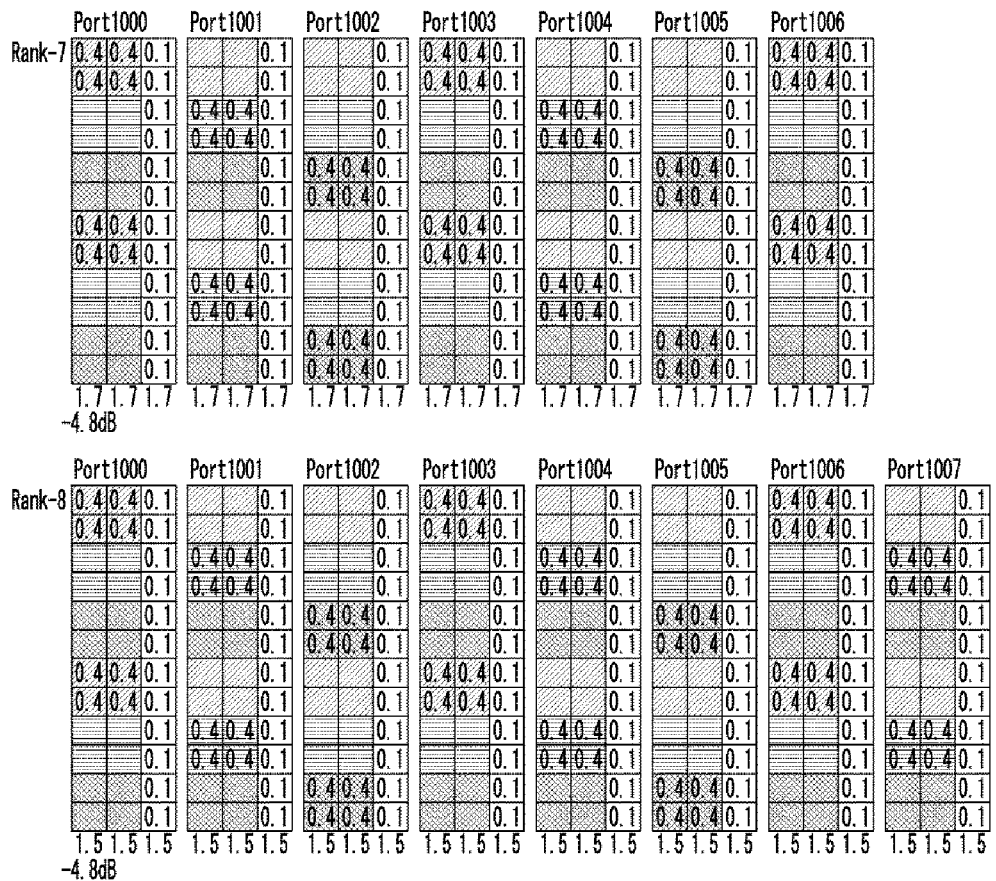
Figure 12:
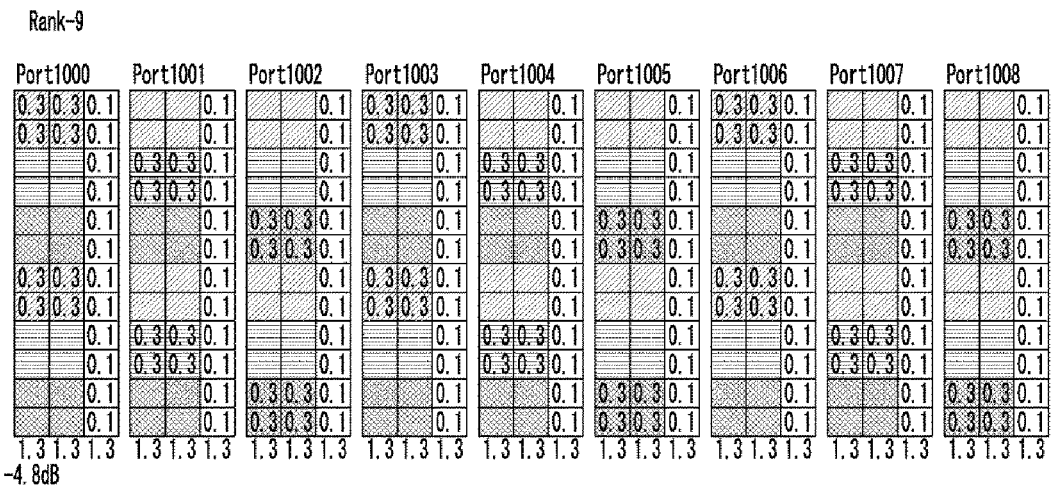
Figure 13:
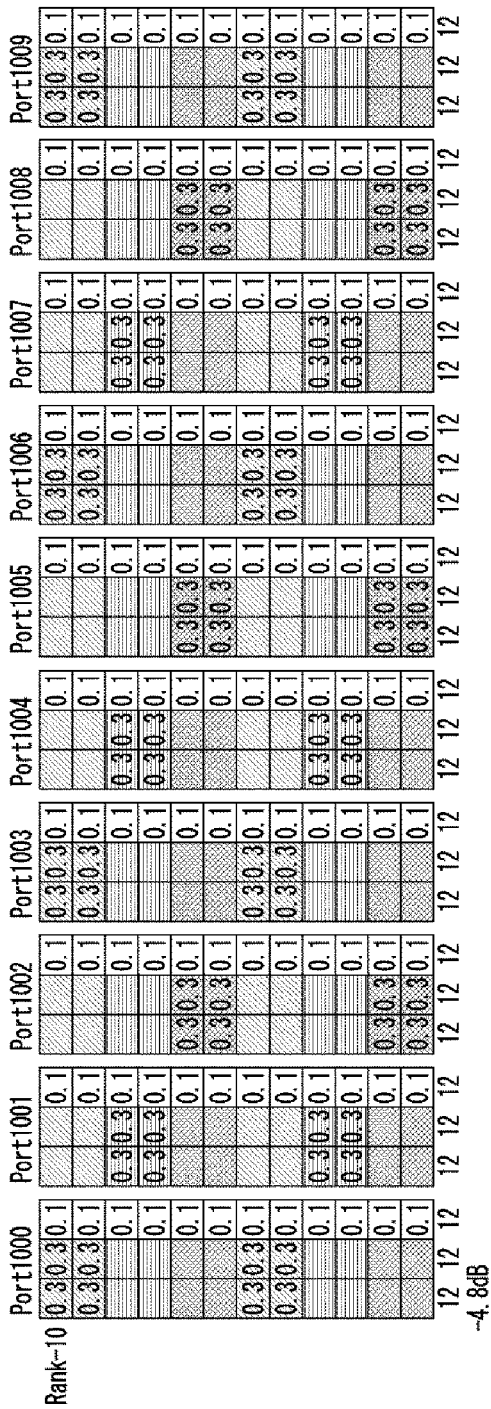
Figure 13:
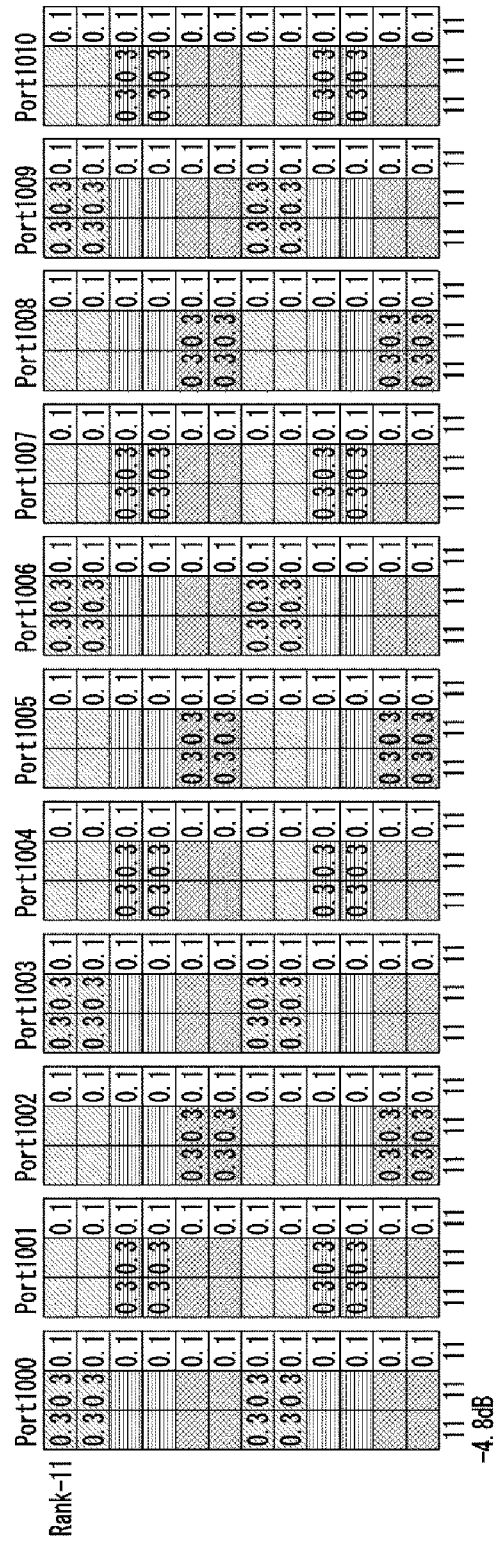

FIG. 12 shows an example of rank 6 to rank 9, and FIG. 13 shows an example of rank 10 and rank 11.

Figure 14:
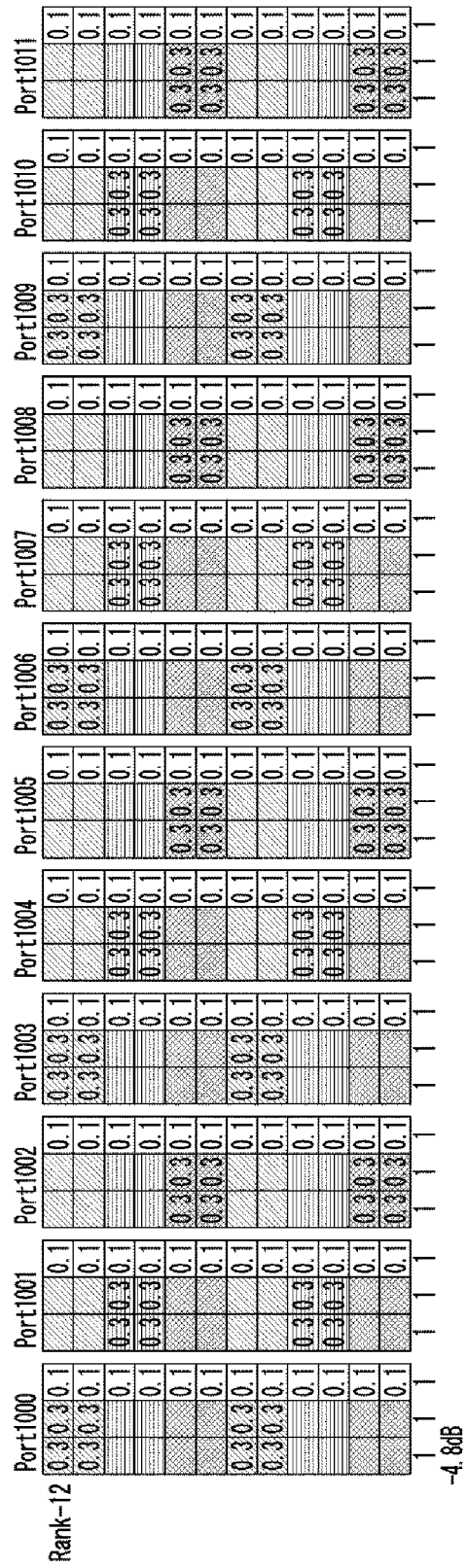

FIG. 14 shows an example of rank 12.

Seventh Embodiment

In the first embodiment to the sixth embodiment, in the case that front load DMRS is mapped to two symbols, data rate matching for the two symbols may be differently configured or a configuration related to multiplexing with other reference signal may be differently configured.

In this case, with respect to each of the symbols to which a DMRS is mapped, whether to boost the power described in the first to sixth embodiments may be independently configured.

That is, whether to boost the power may be determined by considering the data rate matching for each of the symbols to which a DMRS is mapped and/or whether to multiplex with other reference signal.

In the case that data rate matching for each of the symbols and/or whether to multiplex with other reference signal are differently configured, the orthogonality of the OCC on time axis which is applied to each symbol may be lost, and a reception end may maintain the orthogonality by dispreading the OCC on time axis through the following method.

<Method 1>

For example, by using [1 1], [1 −1] which is the OCC on time axis, two ports for transmitting a DMRS is multiplexed, and in the case that the first symbol to which a DMRS is mapped is 0 dB power boosted and the second symbol is 3 dB power boosted, the ODD on time axis may be [1 $\sqrt{2}$], [1 −$\sqrt{2}$].

Since a reception end recognizes that 3 dB power boosting is applied to the second symbols, the reception end may dispread the OCC on frequency axis through [1 1], [1 −1] by deboosting a reception power of the second symbol.

Such a method may be applied to the case that an additional DMRS is mapped to two symbols and multiplexed through the OCC on time axis in the same manner as well as front load DMRS.

<Method 2>

Alternatively, in the case that it is complex to differently apply the power boosting between symbols to which a DMRS is mapped, it may be limited that the power boosting between symbols to which a DMRS is mapped is identically applied between symbols always.

For example, after a boosting value of the power for each symbol to which a DMRS is mapped is computed, the smaller value of the computed values may be applied to the power boosting value of all symbols to which a DMRS is mapped.

<Method 3>

Alternatively, a UE may identify that data rate mating is not differently configured between symbols to which a DMRS is mapped, to which the OCC is applied on time axis, and a multiplexing method with data or other reference signal is not differently configured.

In this case, the power boosting between symbols to which the OCC is applied on time axis may be configured in the same manner always.

In addition, a UE may identify that data rate mating is not differently configured between symbols to which a DMRS is mapped, to which the OCC is not applied on time axis, and a multiplexing method with data or other reference signal is not differently configured. As a result, the power boosting between symbols may be configured in the same manner always.

Eighth Embodiment

Even in the case that an additional DMRS is additionally configured in addition to front load DMRS, the methods described in the first to sixth embodiments are independently applied and whether to apply power boost may be determined.

In addition, since complexity is increased when power boosting between symbols to which a DMRS is mapped is differently applied, it may be limited that the power boosting between symbols to which a DMRS is mapped is identically applied between symbols always.

In this case, as described in method 2, the smallest power boosting value may be applied.

In the symbol to which front load DMRS is mapped, PDSCH/PUSCH or CSI-RS/SR is not multiplexed, but only in the symbol to which an additional DMRS is mapped, PDSCH/PUSCH or CSI-RS/SR is multiplexed. In the case that a rank is a predetermined value or lower, power boosting is applied only to the front load DMRS.

That is, the power boosting for the front load DMRS and the power boosting for the additional DMRS are independently computed and applied.

Alternatively, the power boosting for the front load DMRS and the power boosting for the additional DMRS are independently computed, and the smallest value may be applied to the front load DMRS and the additional DMRS, respectively.

In the case that a CSI-RS is multiplexed and transmitted together in the symbol to which a DMRS is mapped in such a method, in order to prevent a collision with the DMRS, it may be limited that the CSI-RS is transmitted through a single port.

In the case that data is not transmitted in at least one remaining comb except the comb in which a DMRS configured to a UE is transmitted in a symbol to which a DMRS is mapped, and a CSI-RS is transmitted, which is transmitted through a single port in at least one remaining comb in which data is not transmitted, power boosting for a transmission power of a DMRS may become complex.

Accordingly, in order to solve it, a DMRS and a CSI-RS may not be transmitted in the same symbol together in comb in which data is not transmitted. Alternatively, in the case that a CSI-RS is transmitted on a single port, since the CSI-RS is transmitted in only one RE, this may not influence on the boosting value of a transmission power of a DMRS.

In this case, a UE may receive comb information of the demodulation reference signal in which data is not transmitted from an eNB.

Accordingly, the existence of a CSI-RS in the symbol to which a DMRS is mapped is disregarded in the value for determining a transmission power boosting of a DMRS, and a power boosting value may be determined according to the existence of data and SRS.

In this case, in the symbol to which a DMRS is mapped, an SRS is multiplexed and transmitted together (e.g., through the FDM method, etc.). In the case that data is not transmitted in at least one remaining comb except the comb in which a DMRS configured to a UE is transmitted in a symbol to which a DMRS is mapped, and an SRS of 4 comb form is transmitted in the corresponding comb, complexity of power boosting of a DMRS may increase.

Accordingly, the SRS may be transmitted in 2 comb scheme or 4 comb scheme.

That is, an SRS is transmitted to a half of the REs constructing at least one comb in which data is not transmitted and the remaining REs are muted, and accordingly, the computation for power boosting value for a DMRS becomes complex.

In this case, the power of DMRS that may be boosted from the comb to which an SRS is mapped may be 1.5 times, not 2 times. That is, in the case that a port of a specific number or less is configured to a UE in type 1, a transmission power for a DMRS is 1.5 times, not 2 times, boosted.

In addition, in the case that a port of a specific number or less is configured to a UE in type 2, a transmission power for a DMRS is 2.5 times, not 1.5 times or 3 times, boosted.

Accordingly, in order to solve the problem, a DMRS and other reference signal may not be transmitted with being mapped to the same RE or the same symbol.

In the case that a DMRS and other reference signal is not mapped to the same RE or the same symbol together, in order to alleviate an occurrence of limit on scheduling of an eNB, a DMRS and other reference signal is not mapped to the same symbol or the same RE in the same resource block, but may be mapped to the same symbol or the same RE in different RE.

For example, when 10 RBs are existed, in the case that a DMRS is transmitted only in RB 1, CSIRS and/or SRS are/is not transmitted together in the symbol in which a DMRS is transmitted, but in the remaining RB, CSIRS and/or SRS may be transmitted in the symbol in which a DMRS is transmitted.

Hereinafter, this will be described in detail.

Figure 15:
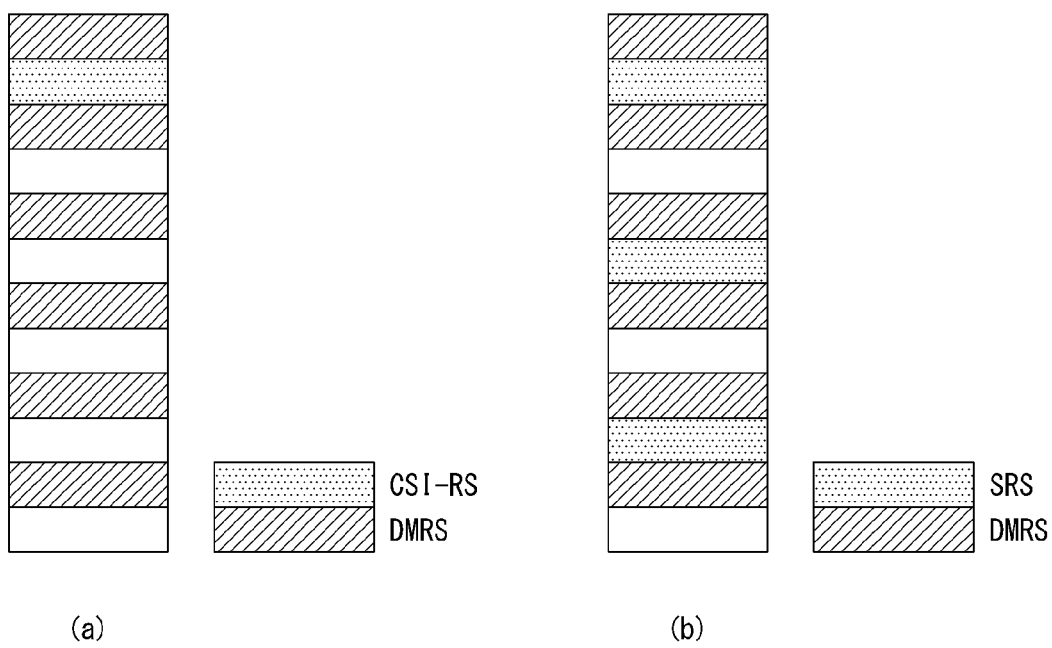
FIG. 15 is a diagram illustrating an example of a mapping method for transmitting a demodulation reference signal and a channel state information reference signal together proposed in the present disclosure.

FIG. 15 is a diagram illustrating an example of a mapping method for transmitting a demodulation reference signal and a channel state information reference signal together proposed in the present disclosure.

Referring to FIG. 15, other reference signal may not be mapped to the symbol or RE to which a DMRS is mapped.

That is, the resource allocated to a group of antenna ports for transmitting a DMRS may not be overlapped with the resource allocated for a CSI-RS.

Particularly, in the case that a CSI-RS or an SRS is multiplexed and transmitted through the FDM method in a symbol of a resource block in which a DMRS is transmitted and there is an empty RE in the symbol in which a DMRS is transmitted, data may be transmitted always in the empty RE.

Alternatively, in order to decrease complexity of transmission power boosting of DMRS, a DMRS and other reference signal may be transmitted through different resources.

That is, other reference signal or data may not be mapped to the symbol or RE to which a DMRS is mapped.

For example, as shown in FIG. 15(*a*), in comb 1 (shaded part), a DMRS may be transmitted, and in comb 2, a CSI-RS of a single port may be transmitted. At this time, a CSI-RS may be transmitted in the RE denoted by dots in comb 2.

In FIG. 15(*a*), in the case that other reference signal or data is not transmitted in the remaining RE (not-shaded RE) except the RE in which a CSI-RS is transmitted in comb 2, the computation for power boosting value for a DMRS becomes complex.

Accordingly, in order to decrease complexity for the computation for power boosting value, other reference signal or data may not be transmitted in the OFDM symbol or RE to which a DMRS is mapped.

Alternatively, it may be configured that data may be transmitted in the remaining REs always.

FIG. 15(*b*) shows an example of the case that in comb 1 (shaded RE), a DMRS is transmitted, and in combs 2 and 3 denoted by dots, an SRS is transmitted.

In an SRS, as described above, the mapping pattern using 2 comb and the mapping pattern using 4 comb may be existed, and FIG. 15(*b*) shows an example of the mapping pattern using 4 comb.

Even in the case of FIG. 15(*b*), like the case of FIG. 15(*a*), data or other reference signal is not transmitted in the RE in which an SRS is not transmitted, the computation for power boosting value for a DMRS becomes complex.

Accordingly, like the case of FIG. 15(*a*), other reference signal or data may not be transmitted in the OFDM symbol or RE to which a DMRS is mapped.

Alternatively, it may be configured that data may be transmitted in the remaining REs always.

FIG. 15 has been described as an example of mapping type 1 of DMRS, but may also be applied to mapping type 2.

Figure 16:
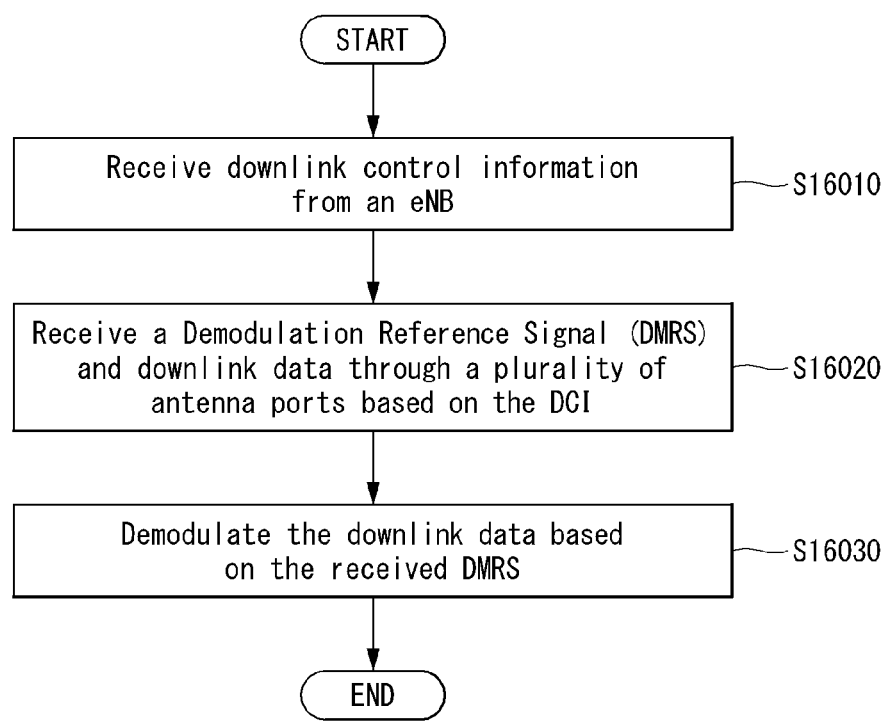
FIG. 16 is a flowchart illustrating an example of a method for transmitting and receiving a demodulation reference signal performed by a UE proposed in the present disclosure.

FIG. 16 is a flowchart illustrating an example of a method for transmitting and receiving a demodulation reference signal performed by a UE proposed in the present disclosure. FIG. 16 is shown just for the convenience of description, but not intended to limit the scope of the present invention.

Referring to FIG. 16, a corresponding UE and an eNB may perform the method(s) described in the embodiments of the present disclosure described above. Particularly, the corresponding UE and the eNB may support the method described in the first embodiment to the eighth embodiment. In FIG. 16, in relation to this, the detailed description overlapped with the contents described above is omitted.

First, a UE may receive downlink control information (DCI) from an eNB (step, S16010).

At this time, as described in the first to sixth embodiments, the DCI may include at least one of mapping pattern information of a DMRS, transmission information indicating whether other reference signal or data is transmitted together in the symbol to which a DMRS is mapped or boosting information indicating whether to boost a transmission power of a DMRS and boosting value.

Later, the UE receives a Demodulation Reference Signal (DMRS) and downlink data through a plurality of antenna ports based on the DCI (step, S16020).

At this time, as described in the first to sixth embodiments, a group of at least one antenna groups for transmitting the DMRS through the same resource among a plurality of antenna ports is not transmitted together with the downlink data depending on the number of symbols related to the downlink data.

That is, at least one antenna group of the groups of the antenna ports for transmitting the DMRS depending on the number of symbols related to the data may not be transmitted together with the data.

For example, the downlink data may be transmitted in the same symbol as the DMRS or transmitted in different symbols depending on the number of symbol related to the downlink data.

Later, the UE may demodulate the downlink data based on the received DMRS (step, S16030).

General Apparatus to which the Present Invention May be Applied

Figure 17:
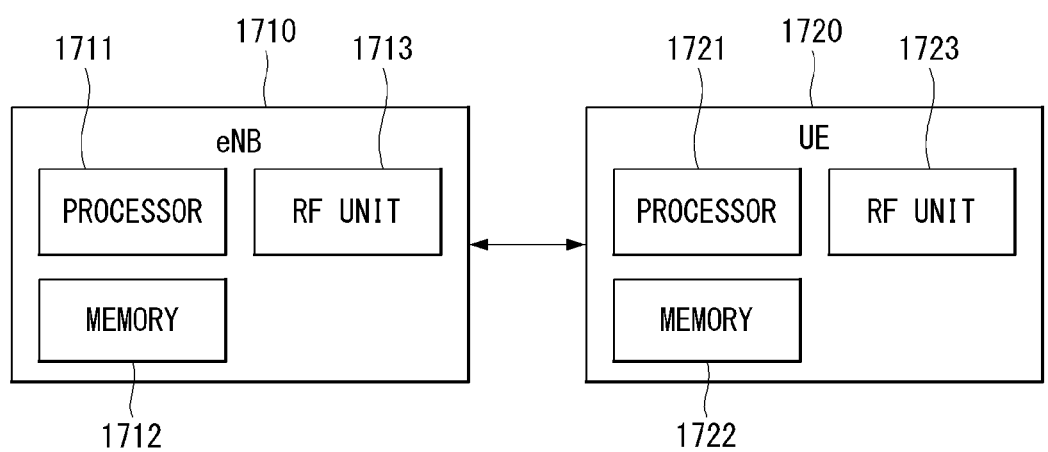
FIG. 17 illustrates a block diagram of a wireless communication apparatus proposed in the present disclosure.

FIG. 17 illustrates a block diagram of a wireless communication apparatus proposed in the present disclosure.

Referring to FIG. 17, a wireless communication system includes a base station (eNB) 1710 and multiple UEs 1720 located in an area of the base station 1710.

Each of the base station and the UE may be represented as a wireless device.

The base station 1710 includes a processor 1711, a memory 1712 and a radio frequency (RF) unit 1713. The processor 1711 implements the functions, processes and/or methods proposed in FIG. 1 to FIG. 15 above. The layers of a wired/wireless interface protocol may be implemented by the processor. The memory 1712 is connected to the processor 1711 and stores various pieces of information for driving the processor. The RF unit 1713 is connected to the processor and transmits and/or receives radio signals.

The UE 1720 includes a processor 1721, a memory 1722 and an RF unit 1723.

The processor 1721 implements the functions, processes and/or methods proposed in FIG. 1 to FIG. 15 above. The layers of a radio interface protocol may be implemented by the processor. The memory 1722 is connected to the processor and stores various pieces of information for driving the processor. The RF unit 1723 is connected to the processor and transmits and/or receives radio signals.

The memory 1712, 1722 may be located inside or outside the processor 1711, 1721 and may be connected to the processor 1711, 1721 by various well-known means.

Furthermore, the base station 1710 and/or the UE 1720 may have a single antenna or multiple antennas.

Figure 18:
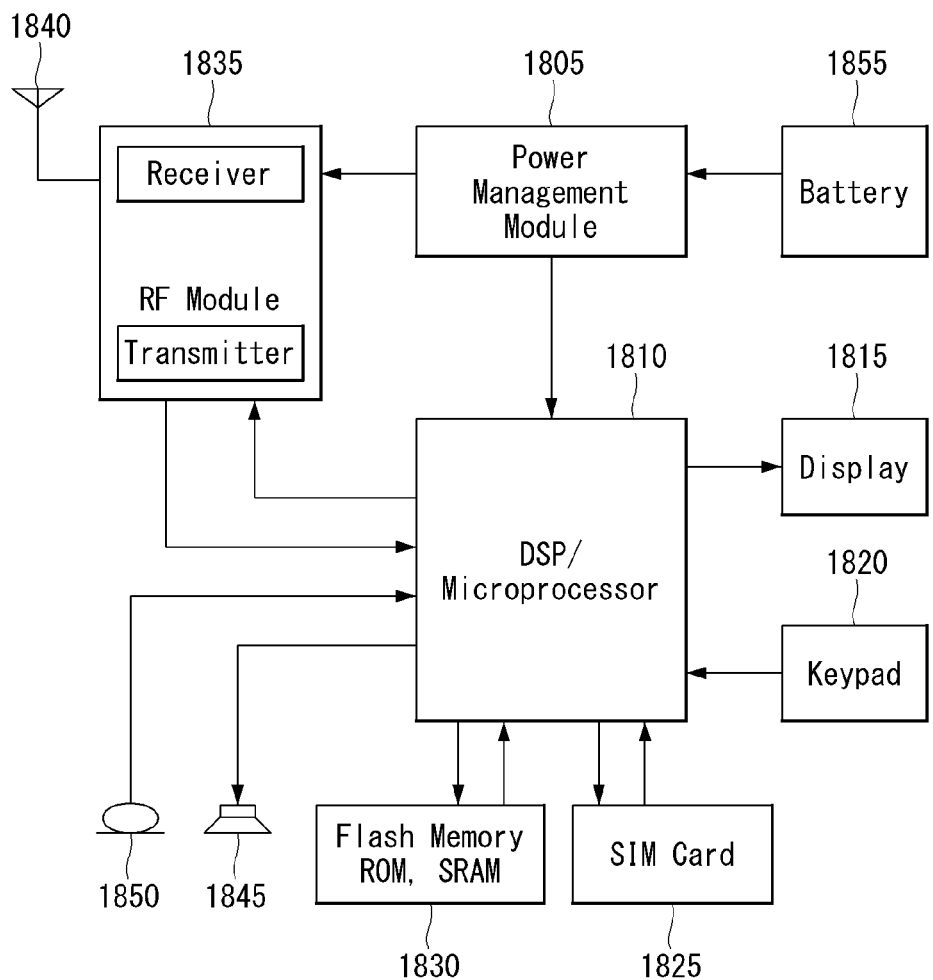
FIG. 18 illustrates a block diagram of a wireless communication apparatus according to an embodiment of the present invention.

FIG. 18 illustrates a block diagram of a wireless communication apparatus according to an embodiment of the present invention.

Particularly, in FIG. 18, the UE described above FIG. 17 will be exemplified in more detail.

Referring to FIG. 18, the UE includes a processor (or digital signal processor; DSP) 1810, RF module (RF unit) 1835, power management module 1805, antenna 1840, battery 1855, display 1815, keypad 1820, memory 1830, Subscriber Identification Module (SIM) card 1825 (which may be optional), speaker 1845 and microphone 1850.

The UE may include a single antenna or multiple antennas.

The processor 1810 may be configured to implement the functions, procedures and/or methods proposed by the present invention as described in FIG. 6 to FIG. 15. Layers of a wireless interface protocol may be implemented by the processor.

The memory 1830 is connected to the processor and stores information related to operations of the processor. The memory 1830 may be located inside or outside the processor and may be connected to the processors through various well-known means.

A user enters instructional information, such as a telephone number, for example, by pushing (or touching) the buttons of a keypad 1820 or by voice activation using the microphone 1850. The processor receives and processes the instructional information to perform the appropriate function, such as to dial the telephone number. Operational data may be retrieved from the SIM card 1825 or the memory module 1830 to perform the function. Furthermore, the processor may display the instructional and operational information on the display 1815 for the user's reference and convenience.

The RF module 1835 is connected to the processor, transmits and/or receives an RF signal. The processor issues instructional information to the RF module, to initiate communication, for example, transmits radio signals comprising voice communication data. The RF module includes a receiver and a transmitter to receive and transmit radio signals. An antenna 1840 facilitates the transmission and reception of radio signals. Upon receiving radio signals, the RF module may forward and convert the signals to baseband frequency for processing by the processor. The processed signals would be transformed into audible or readable information outputted via the speaker 1845.

Figure 19:
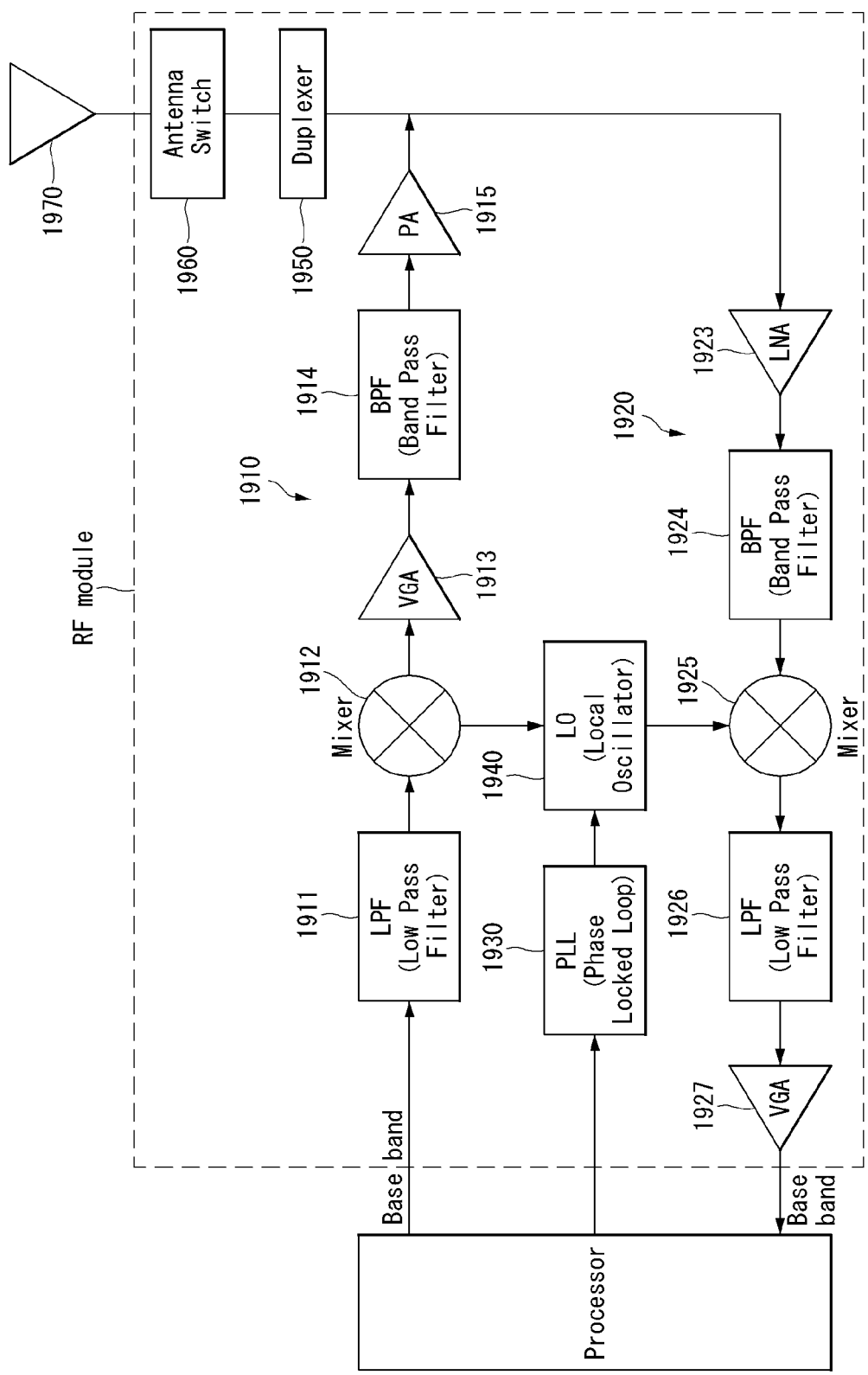
FIG. 19 is a diagram illustrating an example of an RF module of a wireless communication apparatus to which the method proposed in the present disclosure may be applied.

FIG. 19 is a diagram illustrating an example of an RF module of a wireless communication apparatus to which the method proposed in the present disclosure may be applied.

Particularly, FIG. 19 shows an example of an RF module that may be implemented in Frequency Division Duplex (FDD) system.

First, in a transmit path, the processor described in FIG. 17 and FIG. 18 processes data to be transmitted and provides an analog output signal to transmitter 1910.

Within the transmitter 1910, the analog output signal is filtered by a low pass filter (LPF) 1911 to remove undesired images caused by prior digital-to-analog conversion (ADC), upconverted from baseband to RF by an upconverter (Mixer) 1912, and amplified by a variable gain amplifier (VGA) 1913, and the amplified signal is filtered by a filter 1914, further amplified by a power amplifier (PA) 1915, routed through duplexer(s) 1950/antenna switch(s) 1960, and transmitted via an antenna 1970.

In addition, in the receive path, an antenna 1970 receives signals from exterior and provides the received signals, which is routed through antenna switch(s) 1960/duplexer(s) 1950 and provided to the receiver 1920.

Within the receiver 1920, the received signal is amplified by a low noise amplifier (LNA) 1923, filtered by a band pass filter 1924, and downconverted from RF to baseband by a downconverter (Mixer) 1925.

The downconverted signal is filtered by a low pass filter (LPF) 1926, and amplified by a VGA 1927 to obtain an analog input signal, which is provided to the processor described above.

Further, a local oscillator (LO) generator 1940 generates and provides transmission and reception LO signals to upconverter 1912 and downconverter 1925, respectively.

In addition, a phase locked loop (PLL) 1930 may receive control information from the processor and provide control signals to LO generator 1940 to generate the transmission and reception LO signals at the proper frequencies.

The circuits shown in FIG. 19 may be arranged differently from the configuration shown in FIG. 19.

Figure 20:
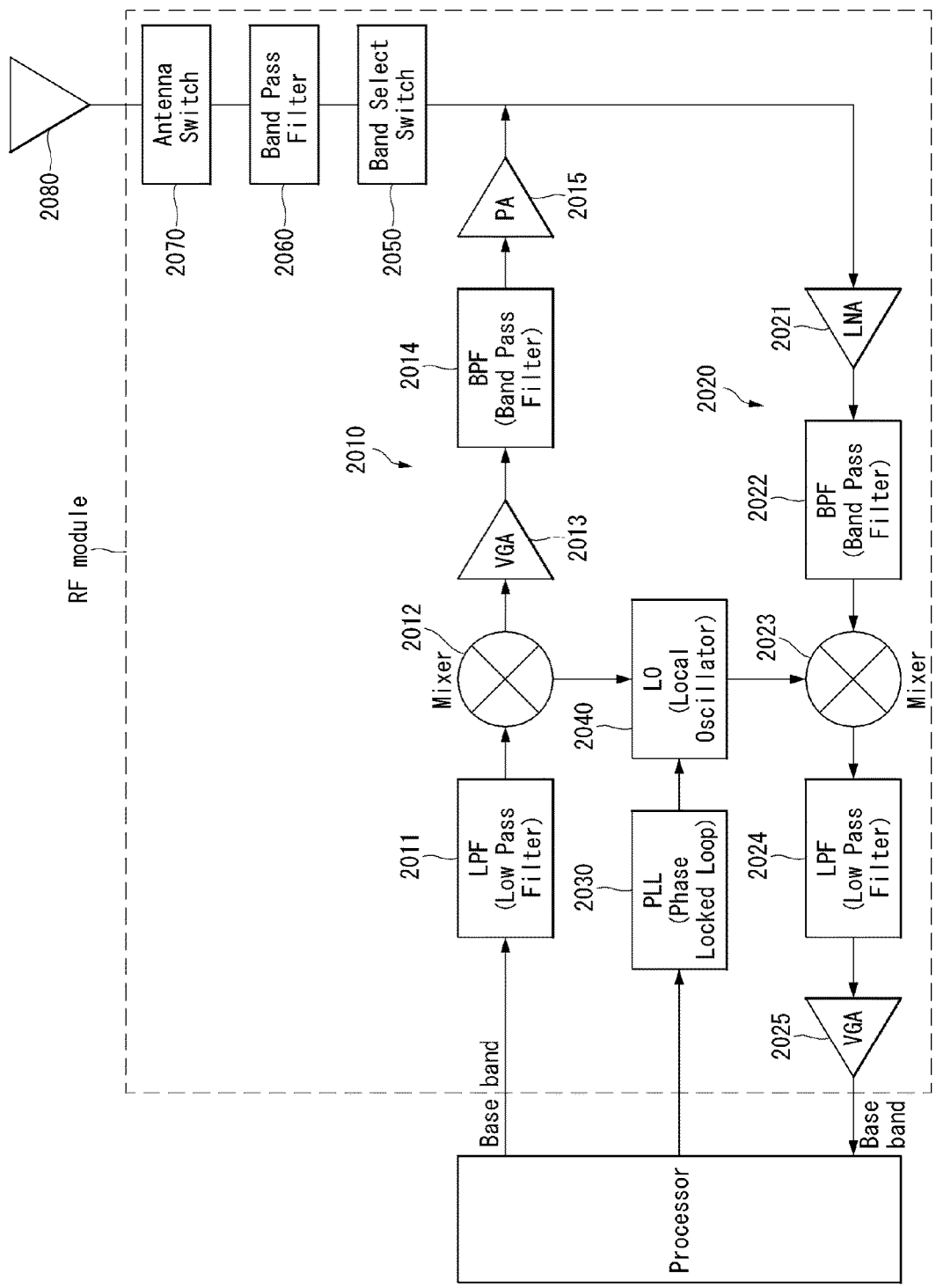
FIG. 20 is a diagram illustrating another example of an RF module of a wireless communication apparatus to which the method proposed in the present disclosure may be applied.

FIG. 20 is a diagram illustrating another example of an RF module of a wireless communication apparatus to which the method proposed in the present disclosure may be applied.

Particularly, FIG. 20 shows an example of an RF module that may be implemented in Time Division Duplex (TDD) system.

The transmitter 2010 and the receiver 2031 of the RF module in the TDD system are the same as the structures of the transmitter and the receiver of the RF module in the FDD system.

Hereinafter, only the structure of the RF module of the TDD system is described, which is different from the RF module of the FDD system, and the same structure is referred to the description of FIG. 19.

The signal amplified by a power amplifier (PA) 2015 of a transmitter is routed through a band select switch 2050, a band pass filter (BPF) 2060 and an antenna switch(s) 2070, and transmitted via an antenna 2080.

Further, in the receive path, the antenna 2080 receives signals from exterior and provides the received signals, which is routed through the antenna switch(s) 2070, the band pass filter (BPF) 2060, and the band select switch 2050, and provided to the receiver 2020.

In the embodiments described above, the components and the features of the present invention are combined in a predetermined form. Each component or feature should be considered as an option unless otherwise expressly stated. Each component or feature may be implemented not to be associated with other components or features. Further, the embodiment of the present invention may be configured by associating some components and/or features. The order of the operations described in the embodiments of the present invention may be changed. Some components or features of any embodiment may be included in another embodiment or replaced with the component and the feature corresponding to another embodiment. It is apparent that the claims that are not expressly cited in the claims are combined to form an embodiment or be included in a new claim by an amendment after the application.

The embodiments of the present invention may be implemented by hardware, firmware, software, or combinations thereof. In the case of implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of implementation by firmware or software, the embodiment of the present invention may be implemented in the form of a module, a procedure, a function, and the like to perform the functions or operations described above. A software code may be stored in the memory and executed by the processor. The memory may be positioned inside or outside the processor and may transmit and receive data to/from the processor by already various means.

It is apparent to those skilled in the art that the present invention may be embodied in other specific forms without departing from essential characteristics of the present invention. Accordingly, the aforementioned detailed description should not be construed as restrictive in all terms and should be exemplarily considered. The scope of the present invention should be determined by rational construing of the appended claims and all modifications within an equivalent scope of the present invention are included in the scope of the present invention.

INDUSTRIAL APPLICABILITY

The present invention applied to a 3GPP LTE/LTE-A/5G system (New RAT system) is primarily described as an example, but may be applied to various wireless communication systems in addition to the 3GPP LTE/LTE-A/5G system (New RAT system).

The invention claimed is:

1. A method for transmitting and receiving a Reference Signal in a wireless communication system, the method performed by a User Equipment comprising:
receiving, from a base station, Downlink Control Information;
receiving a Demodulation Reference Signal (DMRS) and downlink data through a plurality of antenna ports based on the Downlink Control Information; and
demodulating the downlink data based on the DMRS,
wherein a transmission power of the DMRS is '0' dB or '3' dB power boosted in comparison with a transmission power of the downlink data,
wherein the transmission power of the DMRS is determined based on (i) a DMRS type related to the plurality of antenna ports and (ii) a number of the plurality of antenna ports based on the Downlink Control Information,
wherein based on the DMRS type being related to a specific order for an application of multiplexing methods related to the plurality of antenna ports, and based on the number of the plurality of antenna ports being equal to or greater than three:
the transmission power of the DMRS is determined to be '3' dB power boosted.

2. The method of claim 1,
wherein the DMRS type is based on two combs that represent resource elements related to the plurality of antenna ports, and
wherein the specific order is configured such that:
a frequency-code division multiplexing (F-CDM) is used first and a frequency division multiplexing (FDM) is used next as a number of antenna ports based on the DMRS type increases.

3. The method of claim 2, wherein based on a number of symbols for transmitting the downlink data being equal to or smaller than a certain number, and based on the DMRS being multiplexed with the downlink data in the same symbol: the transmission power of the DMRS is '0' dB power boosted.

4. The method of claim 1, wherein the downlink control information includes comb information of the DMRS in which the downlink data is not received, and
wherein a transmission of Channel State Information reference signal is limited such that the DMRS and the Channel State Information reference signal are not multiplexed in the same symbol in the comb of the DMRS in which the downlink data is not received.

5. The method of claim 1, wherein the downlink data is received in all resource elements in which the DMRS is not received among the resource elements included in a symbol in which the DMRS is received.

6. The method of claim 1, wherein different rate matching is applied to each of a plurality of symbols when the DMRS is received in a plurality of symbols.

7. The method of claim 6, wherein each of the DMRSs is received through different transmission power according to the plurality of symbols in which the DMRS is received.

8. A User Equipment for transmitting and receiving a Reference Signal in a wireless communication system, the User Equipment comprising:
a Radio Frequency (RF) unit; and
a processor configured to control the RF unit,
wherein the processor is further configured to:
receive, from a base station, Downlink Control Information;
receive a Demodulation Reference Signal (DMRS) and downlink data through a plurality of antenna ports based on the Downlink Control Information; and
demodulate the downlink data based on the DMRS,
wherein a transmission power of the DMRS is '0' dB or '3' dB power boosted in comparison with a transmission power of the downlink data,
wherein the transmission power of the DMRS is determined based on (i) a DMRS type related to the plurality of antenna ports and (ii) a number of the plurality of antenna ports based on the Downlink Control Information,
wherein based on the DMRS type being related to a specific order for an application of multiplexing methods related to the plurality of antenna ports, and based on the number of the plurality of antenna ports being equal to or greater than three:
the transmission power of the DMRS is determined to be '3' dB power boosted.

9. The User Equipment of claim 8, wherein the DMRS type is based on two combs that represent resource elements related to the plurality of antenna ports, and
wherein the specific order is configured such that:
a frequency-code division multiplexing (F-CDM) is used first and a frequency division multiplexing (FDM) is used next as a number of antenna ports based on the DMRS type increases.

10. The User Equipment of claim 9, wherein when the transmission power of the DMRS is determined based on whether the DMRS is multiplexed in the same OFDM symbol as the downlink data, the transmission power of the DMRS is '0' dB power boosted when the DMRS is multiplexed in the same symbol as the downlink data, or '3' dB power boosted, otherwise.

11. The User Equipment of claim 8, wherein the downlink control information includes comb information of the DMRS in which the downlink data is not received, and wherein a transmission of Channel State Information reference signal is limited such that the DMRS and the Channel State Information reference signal are not multiplexed in the same symbol in the comb of the DMRS in which the downlink data is not received.

12. The User Equipment of claim 8, wherein the downlink data is received in all resource elements in which the DMRS is not received among the resource elements included in a symbol in which the DMRS is received.

13. The User Equipment of claim 8, wherein different rate matching is applied to each of a plurality of symbols when the DMRS is received in a plurality of symbols.

14. The User Equipment of claim 13, wherein each of the DMRSs is received through different transmission power according to the plurality of symbols in which the DMRS is received.

* * * * *